US009135088B2

(12) United States Patent
Endo

(10) Patent No.: US 9,135,088 B2
(45) Date of Patent: Sep. 15, 2015

(54) MULTI PROCESSING SYSTEM

(71) Applicant: KYOCERA Document Solutions Inc., Osaka (JP)

(72) Inventor: Wataru Endo, Osaka (JP)

(73) Assignee: Kyocera Document Solutions Inc. (JP)

( * ) Notice: Subject to any disclaimer, the term of this patent is extended or adjusted under 35 U.S.C. 154(b) by 29 days.

(21) Appl. No.: 13/964,128

(22) Filed: Aug. 12, 2013

(65) Prior Publication Data

US 2014/0068633 A1 Mar. 6, 2014

(30) Foreign Application Priority Data

Aug. 29, 2012 (JP) .................................. 2012-188721
Aug. 29, 2012 (JP) .................................. 2012-188722

(51) Int. Cl.
| G06F 13/00 | (2006.01) |
| G06F 9/46 | (2006.01) |
| G06F 12/00 | (2006.01) |
| G06F 15/173 | (2006.01) |
| H04L 12/28 | (2006.01) |
| G06F 9/54 | (2006.01) |

(52) U.S. Cl.
CPC . *G06F 9/54* (2013.01); *G06F 9/465* (2013.01)

(58) Field of Classification Search
None
See application file for complete search history.

(56) References Cited

U.S. PATENT DOCUMENTS

| 6,381,682 B2* | 4/2002 | Noel et al. ................. 711/153 |
| 6,493,801 B2* | 12/2002 | Steely et al. ............... 711/135 |
| 7,864,713 B2* | 1/2011 | Ban ............................ 370/256 |
| 7,869,384 B2* | 1/2011 | Fang et al. ................. 370/256 |
| 2003/0091026 A1* | 5/2003 | Penfield et al. ............ 370/352 |
| 2004/0085962 A1* | 5/2004 | Sugai et al. ................ 370/392 |
| 2009/0106507 A1* | 4/2009 | Skerlj et al. ............... 711/154 |

FOREIGN PATENT DOCUMENTS

| JP | 2009-258937 | 11/2009 |
| WO | 0217106 | 2/2002 |

* cited by examiner

*Primary Examiner* — H S Sough
*Assistant Examiner* — Phuong Hoang

(57) ABSTRACT

In a multi processing system, packet routing units are arranged in respective middleware layers in first nodes corresponding to memory spaces connected to plural processor cores and perform routing of a packet among parent nodes and child nodes in a tree. The child nodes are user nodes that are objects of respective application layers in the memory spaces. The first nodes are the parent nodes. The user nodes, the first nodes, and a second node in the tree are assigned addresses that identify parent-child relationship of nodes in the tree. The second node is a parent node of the first nodes. The packet routing unit (a1) stores the packet if the source address is identical to an own node address, (a2) transfers the packet to a child node if the source address indicates the child node, and (a3) transfers the packet to a parent node in the other cases.

14 Claims, 21 Drawing Sheets

FIG. 7A

| ITEM NAME | VALUE |
|---|---|
| OWN NODE ADDRESS | [1,0] |
| CHILD NODE ADDRESS | [1,1]/[1,2] |
| CHILD NODE I/F TYPE | 0/0 |
| CHILD NODE I/F PROPERTY | NULL/NULL |
| PARENT NODE I/F TYPE | 0 |
| PARENT NODE I/F PROPERTY | NULL |

FIG. 7B

| ITEM NAME | VALUE |
|---|---|
| OWN NODE ADDRESS | [0,0] |
| CHILD NODE ADDRESS | [1,0]/[2,0]/[3,0] |
| CHILD NODE I/F TYPE | 0/1/2 |
| CHILD NODE I/F PROPERTY | NULL/X1/Y1 |
| PARENT NODE I/F TYPE | NULL |
| PARENT NODE I/F PROPERTY | NULL |

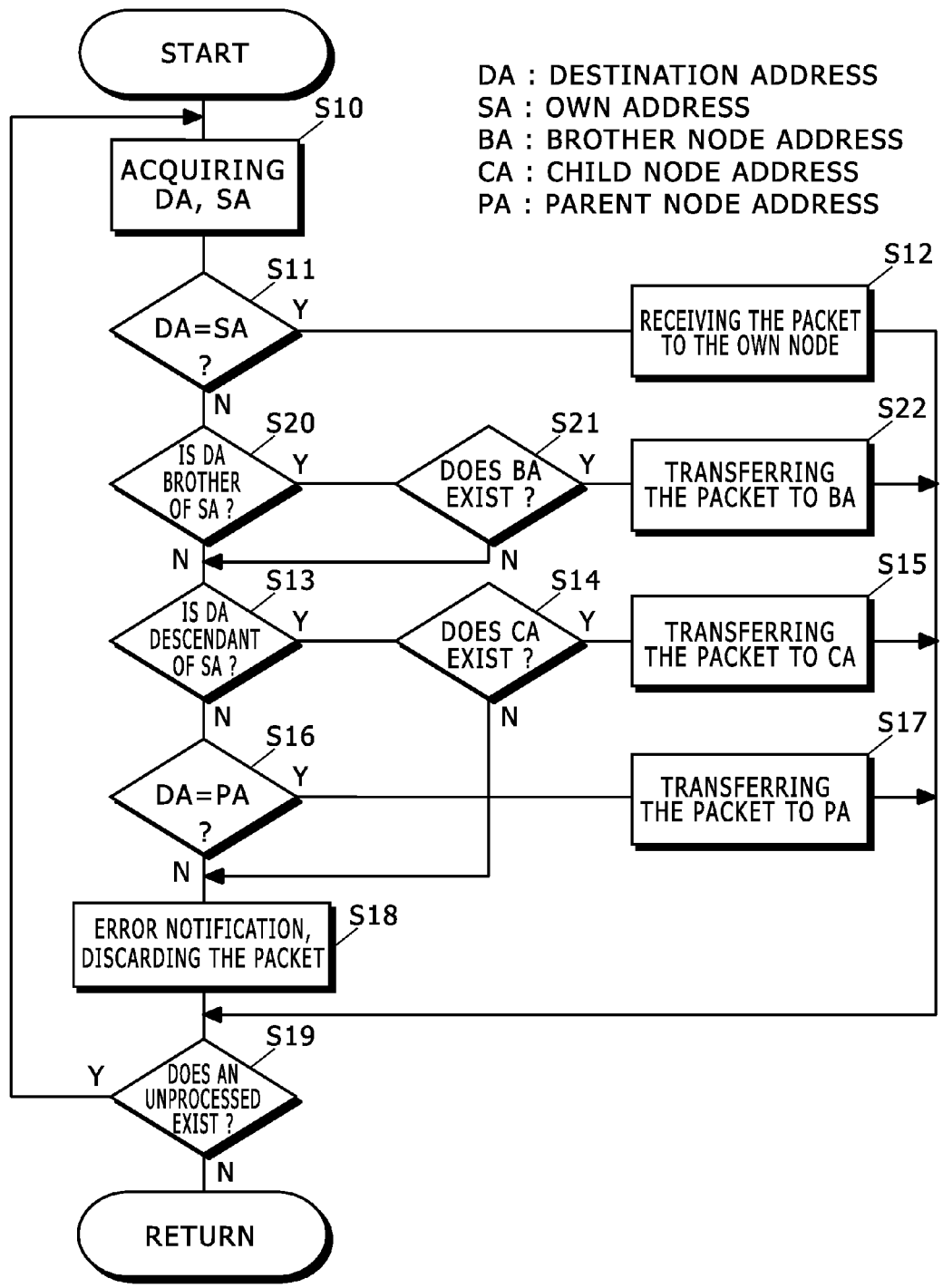

FIG. 13A

| ITEM NAME | VALUE |
|---|---|
| OWN NODE ADDRESS | [1,1,0] |
| CHILD NODE ADDRESS | [1,1,1] |
| CHILD NODE I/F TYPE | 0 |
| CHILD NODE I/F PROPERTY | NULL |
| BROTHER NODE ADDRESS | [1,2,0]/[1,3,0]/[1,4,0] |
| BROTHER NODE I/F TYPE | X2/X3/X4 |
| BROTHER NODE I/F PROPERTY | NULL |
| PARENT NODE I/F TYPE | 0 |
| PARENT NODE I/F PROPERTY | NULL |

FIG. 13B

| ITEM NAME | VALUE |
|---|---|
| OWN NODE ADDRESS | [1,0,0] |
| CHILD NODE ADDRESS | [1,1,0]/[1,2,0]/[1,3,0]/[1,4,0] |
| CHILD NODE I/F TYPE | 0/1/1/1 |
| CHILD NODE I/F PROPERTY | NULL/X2/X3/X4 |
| BROTHER NODE ADDRESS | NULL |
| BROTHER NODE I/F TYPE | NULL |
| BROTHER NODE I/F PROPERTY | NULL |
| PARENT NODE I/F TYPE | 0 |
| PARENT NODE I/F PROPERTY | NULL |

FIG. 13C

| ITEM NAME | VALUE |
|---|---|
| OWN NODE ADDRESS | [0,0,0] |
| CHILD NODE ADDRESS | [1,0,0]/[2,0,0]/[3,0,0]/[4,0,0] |
| CHILD NODE I/F TYPE | 0/2/2/2 |
| CHILD NODE I/F PROPERTY | NULL/Y2/Y3/Y4 |
| BROTHER NODE ADDRESS | NULL |
| BROTHER NODE I/F TYPE | NULL |
| BROTHER NODE I/F PROPERTY | NULL |
| PARENT NODE I/F TYPE | NULL |
| PARENT NODE I/F PROPERTY | NULL |

MULTI PROCESSING SYSTEM

CROSS-REFERENCE TO RELATED APPLICATIONS

This application relates to and claims priority rights from a Japanese Patent Application No. 2012-188722, filed on Aug. 29, 2012, and a Japanese Patent Application No. 2012-188721, filed on Aug. 29, 2012, the entire disclosures of which are hereby incorporated by reference herein.

BACKGROUND

1. Field of the Present Disclosure

The present disclosure relates to a multi processing system.

2. Description of the Related Art

Multi core processors and multi processors are used to break through the limit of increasing performance of a single core processor due to increasing leak current and consumption electronic power.

In an embedded system, an asymmetrical multi processing (AMP) system is used to gain cost performance and reduce electronic power consumption. An AMP system assigns functions to respective processor cores and the processor cores execute respective specific programs.

In such a system, communication is performed between processor cores in a multi core processor through a multi core communication API (MCAPI (registered trademark): Multi-core Communications Application Program Interface), an OS (Operating System), and a middleware (the communication is not performed through an OS in some cases); and processors are connected with PCI express (PCIe) and communication is performed between the processors through device drivers of PCI express (PCIe) and the OS.

Therefore, it is required to choose different communication manners corresponding to respective hardware configurations for communication between user nodes (objects in applications) performed between processor cores, and consequently programming is complicated.

Further if a configuration of a multi processing system is changed for system improvement, then according to it, it is required to change a software configuration for inter user node communication.

Further, for example, in a case that a first processor core is connected via a second processor core to a third processor core, the first processor core can not perform direct software communication with the third processor core.

SUMMARY

A multi processing system according to an aspect of the present disclosure includes packet routing units arranged in respective middleware layers in first nodes corresponding to memory spaces connected to plural processor cores and configured to perform routing of a packet among parent nodes and child nodes in a tree. The child nodes are user nodes that are objects of respective application layers in the memory spaces; the first nodes are objects that are the parent nodes of the child nodes; nodes that include the user nodes, the first nodes, and a second node in the tree are assigned addresses that identify parent-child relationship of the nodes; the packet includes a source address and a destination address in a header; and the second node is an object that is a parent node of the first nodes. Each one of the packet routing units is further configured to (a1) store the packet as a packet addressed to an own node if the source address in the header is identical to an own node address, (a2) transfer the packet to a child node if the source address in the header indicates the child node, and (a3) transfer the packet to a parent node of the own node in the other cases.

A multi processing system according to an aspect of the present disclosure includes packet routing units arranged in middleware layers in first nodes corresponding to memory spaces connected to plural processor cores and configured to perform routing of a packet among parent nodes and child nodes in a tree. The child nodes are user nodes that are objects of respective application layers in the memory spaces; the first nodes are objects that are the parent nodes of the child nodes; nodes that include the user nodes, the first nodes, and a second node in the tree are assigned addresses that identify parent-child relationship of the nodes; the packet includes a source address and a destination address in a header; and the second node is an object that is a parent node of the first nodes. Each one of the packet routing units of the user nodes in the tree comprises a name resolution table and is further configured to perform a name resolution process before a routing process, the name resolution table relates a name of the user node and an address of the user node; and the packet routing unit is further configured to (a1) convert a name used instead of either the source address or the destination address in the header to an address corresponding to the name, and (a2) replace the name in the header to the address if the name is found in the name resolution table, and (b) to inform an exception error to an operating system if the name is not found in the name resolution table, in the name resolution process.

A multi processing system according to an aspect of the present disclosure includes packet routing units arranged in respective middleware layers in first nodes corresponding to memory spaces connected to plural processor cores and configured to perform routing of a packet among parent nodes and child nodes in a tree. The child nodes are user nodes that are objects of respective application layers in the memory spaces; the first nodes are objects that are the parent nodes of the child nodes; nodes that include the user nodes, the first nodes, and a second node in the tree are assigned addresses that identify parent-child relationship of the nodes; the packet includes a source address and a destination address in a header; and the second node is an object that is a parent node of the first nodes.

Each one of the packet routing units of nodes other than a root node in the tree does not comprises a name resolution table and is configured to transfer the packet to the parent node of the own node if a name is used instead of either the source address or the destination address in the header. The packet routing unit of the root node comprises a name resolution table and is further configured to perform a name resolution process before a routing process, the name resolution table relates a name of the user node and an address of the user node, and the packet routing unit of the root node is further configured to (a1) convert a name used instead of either the source address or the destination address in the header to an address corresponding to the name, and (a2) replace the name in the header to the address if the name is found in the name resolution table, and (b) to inform an exception error to an operating system if the name is not found in the name resolution table, in the name resolution process.

A multi processing system according to an aspect of the present disclosure includes packet routing units arranged in respective middleware layers in first nodes corresponding to memory spaces connected to plural processor cores and configured to perform routing of a packet among parent nodes and child nodes in a tree. The child nodes are user nodes that are objects of respective application layers in the memory spaces; the first nodes are objects that are the parent nodes of the child nodes; nodes that include the user nodes, the first nodes, and a second node in the tree are assigned addresses that identify parent-child relationship of the nodes; the packet includes a source address and a destination address in a header; and the second node is an object that is a parent node of the first nodes. Each one of the packet routing units of the user nodes in the tree is configured to transfer the packet to a parent node of the own node if a name is used instead of either the source address or the destination address in the header. Each one of the packet routing units of nodes other than the user nodes comprises a name resolution table and is further configured to perform a name resolution process before a routing process, the name resolution table relates a name and an address for the own node and all descendant nodes of the own node, and each one of the packet routing units of nodes other than the user nodes is further configured to (a1) convert a name used instead of either the source address or the destination address in the header to an address corresponding to the name, and (a2) replace the name in the header to the address if the name is found in the name resolution table, (b) to transfer the packet to a parent node of the own node if the name is not found in the name resolution table and the own node has the parent node; and (c) to inform an exception error to an operating system if the name is not found in the name resolution table and the own node does not have a parent node, in the name resolution process.

A multi processing system according to an aspect of the present disclosure includes packet routing units arranged in respective middleware layers in first nodes corresponding to memory spaces connected to plural processor cores and configured to perform routing of a packet among parent nodes and child nodes in a tree. The child nodes are user nodes that are objects of respective application layers in the memory spaces; the first nodes are objects that are the parent nodes of the child nodes; nodes that include the user nodes, the first nodes, and a second node in the tree are assigned addresses that identify parent-child relationship of the nodes; the packet includes a source address and a destination address in a header; and the second node is an object that is a parent node of the first nodes. Each one of the packet routing units comprises a name resolution table and is further configured to perform a name resolution process before a routing process, the name resolution table relates a name of the user node and an address of the user node, and each one of the packet routing units is further configured to (a1) convert a name used instead of either the source address or the destination address in the header to an address corresponding to the name, and (a2) replace the name in the header to the address if the name is found in the name resolution table, (b) to transfer the packet to a parent node of the own node if the name is not found in the name resolution table and the own node has the parent node; and (c) to inform an exception error to an operating system if the name is not found in the name resolution table and the own node does not have a parent node, in the name resolution process.

These and other objects, features and advantages of the present invention will become more apparent upon reading of the following detailed description along with the accompanied drawings.

BRIEF DESCRIPTION OF THE DRAWINGS

FIG. 7A and FIG. 7B show diagrams which indicate respective routing tables of a node N10 and a node N00 shown in FIG. 3;

FIG. 12 shows a schematic flowchart which indicates a routing process for any one of nodes other than leaf nodes to transfer a packet in its transfer buffer to a next node;

FIG. 13A to FIG. 13C show diagrams which indicate respective routing tables of a node N110, a node N100, and a node N000 shown in FIG. 11;

DETAILED DESCRIPTION

Embodiment 1

Figure 1:
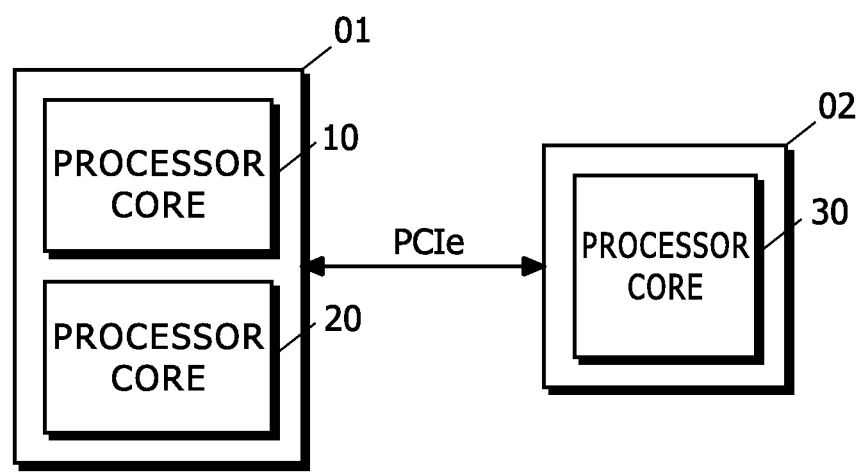
FIG. 1 shows a schematic configuration diagram which indicates a multi processing system according to Embodiment 1 of the present disclosure.

FIG. 1 shows a schematic configuration diagram which indicates a multi processing system according to Embodiment 1 of the present disclosure.

In this system, a multi core processor 01 and a single core processor 02 are connected to each other with PCIe. The multi core processor 01 includes a processor core 10 and a processor core 20, and connects them with an unshown internal bus. A processor core 30 of the single core processor 02 is connected to the internal bus of the multi core processor 01 with PCIe.

Figure 2:
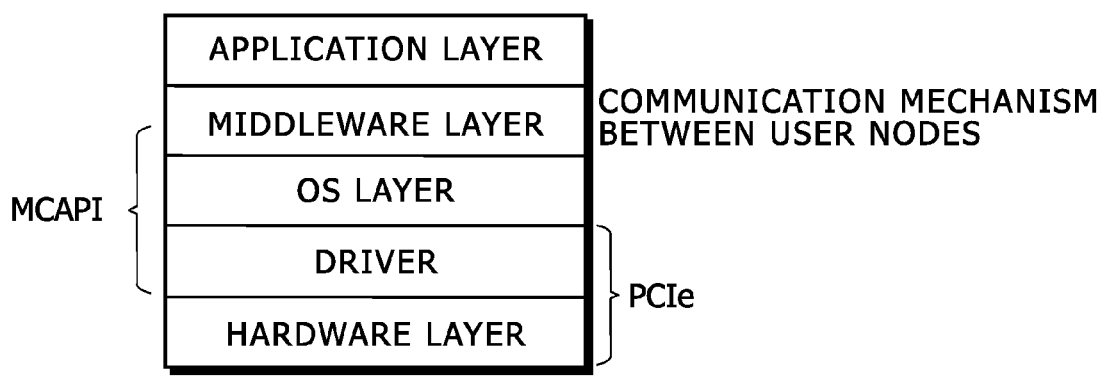
FIG. 2 shows a schematic layer structure diagram from an application layer to a hardware layer.

FIG. 2 shows a schematic layer structure diagram from an application layer to a hardware layer.

In an OS layer and lower layers, as well as a conventional manner, communication between the processor cores 10 and 20 is performed with the aforementioned MCAPI, and communication between the processor core 10 and the processor core 30 and between the processor core 20 and the processor core 30 is performed with PCIe.

In Embodiment 1, the system is equipped with an inter object communication mechanism mentioned below and consequently, in inter user node communication (where a user node is an object in a user application), it is possible to perform communication in a common manner without selecting a communication type among MCAPI and PCIe, namely, regardless of a position of a communication counterpart in hardware configuration.

Figure 3:
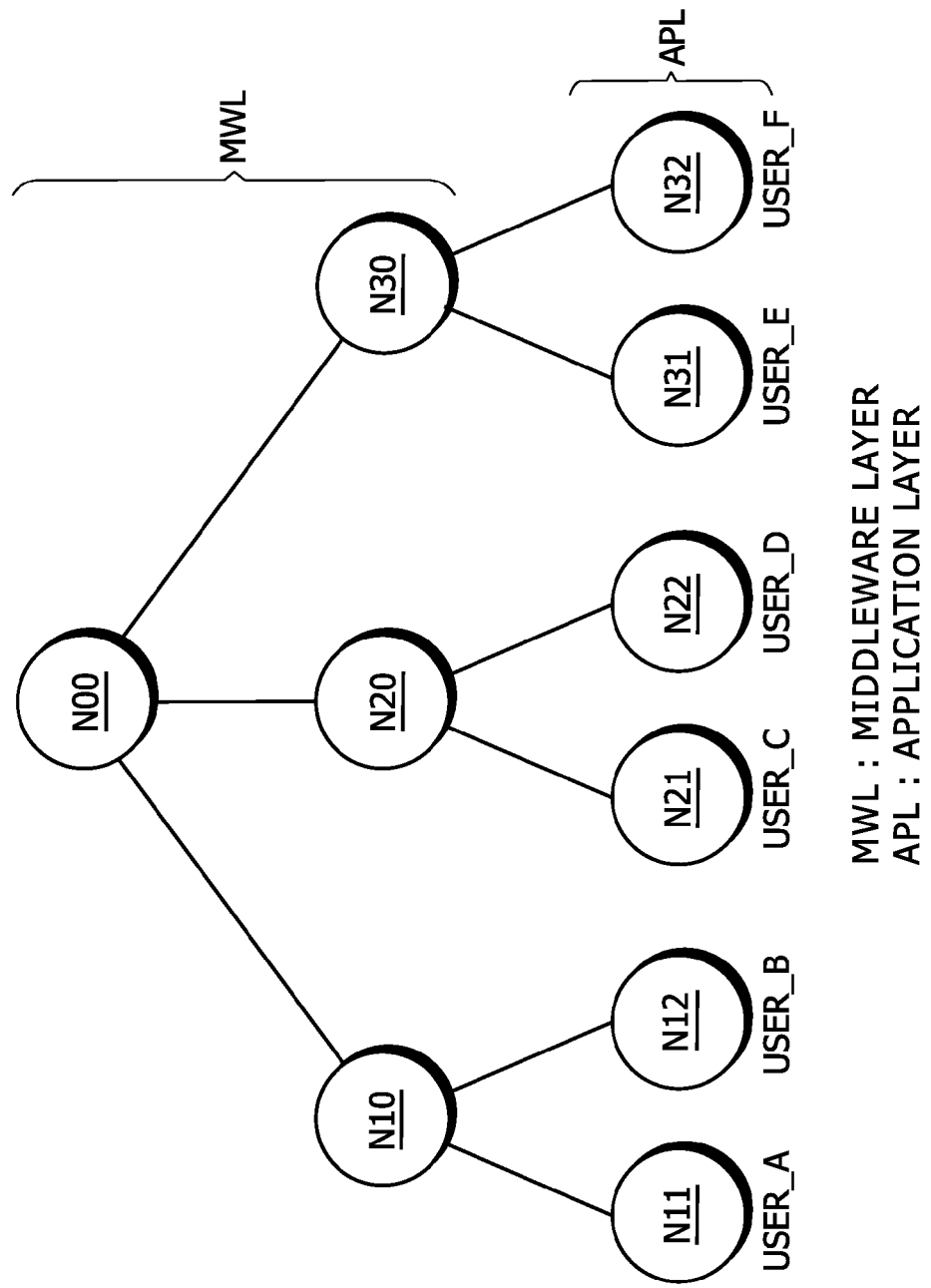
FIG. 3 shows a tree diagram of nodes as inter user node communication objects in Embodiment 1 of the present disclosure.

In FIG. 3, both of user nodes N11 and N12 as leaf nodes are objects in an application layer arranged in a memory space connected to (accessible from) the processor core 10. Hereinafter, these objects may belong to respective different applications or may belong to a same application.

User nodes N21 and N22 as leaf nodes are respective objects in an application layer arranged in a memory space connected to the processor core 20 as well. Further, user nodes N31 and N32 as leaf nodes are respective objects in an application layer arranged in a memory space connected to the processor core 30 as well.

The number of communication paths among these six objects is 15 (6×5/2=15), and the larger number of the communication objects results in the larger number of communication paths. Further, it is difficult to generalize the communication configuration for direct communication between objects in an application layer in different memory spaces.

Therefore, using inter node communication in a tree structure as shown in FIG. 3, communication is performed between any leaf nodes. In other words, sequentially performing packet transfer between a parent node and a child node connected with an edge, communication between user nodes in an application layer. Nodes connected with an edge know each other, and it means that data communication is available between these nodes.

Nodes N10, N20, and N30 are respective communication objects in a middleware layer arranged in memory spaces connected to the processor cores 10, 20, and 30 shown in FIG. 1. Further a root node N00 is a virtual node and communication object in a middleware layer in a memory space connected to one of the processor cores 10, 20, and 30 (favorably, a processor core where the largest communication amount between processors is expected).

It is easy to perform direct communication between objects in an application layer in a same memory space. However, these objects may be located in different memory spaces due to system change in the future, and therefore, regardless of whether objects are located in a same memory space or not, communication between the objects may be performed uniformly using the tree structure shown in FIG. 3.

Leaf nodes (source nodes and destination nodes) are connected to only respective parent nodes, and therefore, a packet must be transferred from a leaf node to its parent node. Each node other than the leaf nodes (intermediate nodes) refers to a routing table and determines its next nodes to which a packet is transferred. An intermediate node determines the next node on the basis of the own node address and the destination address, and the next node is one of nodes connected with edges to the intermediate node. The number of times to refer the routing table is reduced if node addresses are determined under the condition that on the basis of the address values it can be identified parent-child relationship between nodes, whether or not it is a leaf node, and whether or not it is a root node; and consequently the process speed increases.

If an address of a node Nij shown in FIG. 3 is described as [i, j], these i and j are set so as to satisfy the aforementioned condition. Therefore, when i is not zero and j is not zero, a node Nij is a leaf node in a depth of 2, its parent node is described as j=0, and a parent node of the parent node is a root node N00 as i=0. The root node does not have a parent node. Each node other than the root node has only one parent node (i.e. has only one upward edge), and therefore it is not necessary to select one among parent nodes.

For example, if respective ones of i and j are expressed as 4 bit, a node address [i, j] is 8 bit data and can express 256 nodes at the maximum.

Subsequently, an example is explained of data transmission between leaf nodes. In the following part, an own node address is expressed as [i, j] and a destination address is expressed as [i2, j2].

For example, when data is transmitted from the node N11 to the node N12, the leaf node N11 does not have any child nodes, and the data is transmitted from the node N11 to its parent node N10, that is, a node identified by changing j in the address of the own node N11 to zero. The node N10 is connected to the destination node N12 as its child node, and therefore transfers the data to the node N12.

When data is transmitted from the node N11 to the node N32, the leaf node N11 does not have any child nodes, and the data is transmitted from the node N11 to its parent node N10, that is, a node identified by changing j in the address of the own node N11 to zero. Since i is not i2 and the node N10 is not connected to the destination node N32 as its child node, the data is transferred from the node N10 to the root node N00 as its parent node, that is, a node identified by changing i in the address of the own node N10 to zero. The data is transferred from the root node N00 to a node N30 that is, a node identified by changing j2 in the address of the destination node N32 to zero. Subsequently, the data is transferred to a child node N32 that is, a node identified by changing j in the address of the own N30 to 2.

In general, routing at the own node Nij is performed for a packet to the destination node Ni2j2 according to the following rule.

(1) If i=i2 and j=j2, then the own node receives the packet identified as data of which the destination is the own node.

(2) If the own node is the root node (i=0, j=0), and a child node address CA=[i2, 0] is found in the routing table, then the own node transfers the packet to this child node. If the own node is a node in a depth of 1 (i is not zero, j=0), and a child node address CA=[i2, j2] is found in the routing table, then the own node transfers the packet to this child node.

(3) In the other cases, if the own node has a parent node, that is, the own node is not the root node, then the own node transfers the packet to the parent node address PA, that is, PA=[i, 0] if the own node is a leaf node (i is not zero, j is not zero) or PA=[0, 0] if the own node is a node in a depth of 1 (i is not zero, j=0).

In a destination node, it is necessary to distinguish data transferred from plural leaf nodes in parallel. Therefore, a header of data to be transmitted includes not only a destination node address but also a source node address. Further, when DSmax is defined as the minimum value among maximum data sizes that nodes can transmit at once due to hardware configuration or software configuration, for data of a size larger than DSmax, a packetizing process is performed, in which the data is divided into plural pieces so that a data size of each piece that a header is attached to does not exceed DSmax, and the header is attached to each piece. In such a case, to indicate a relation between packets of the data, a packet sequence number (a next packet sequence number=a current sequence number+the number of bytes of a payload in a current packet) is attached in the header as well as IP protocol.

Figure 4:
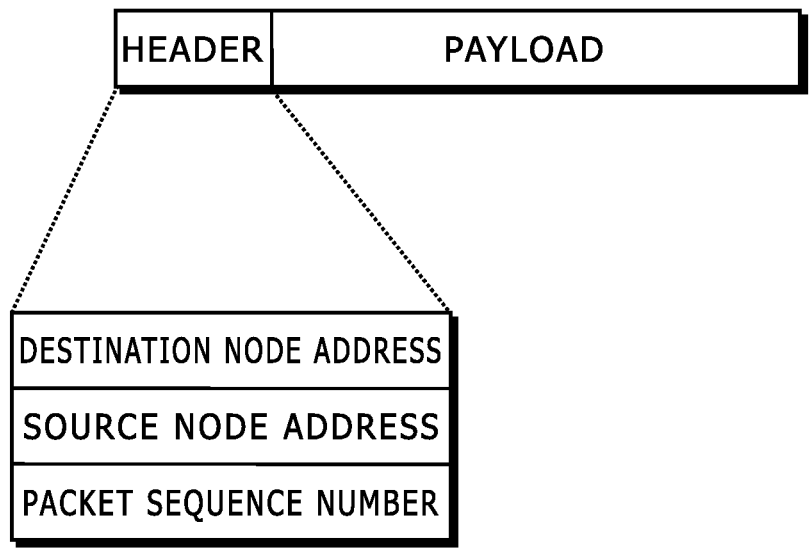
FIG. 4 shows a schematic format diagram of a packet to be transmitted in the inter user node communication.

FIG. 4 shows a format of a packet used in this system; and a packet includes a payload, and a header attached to the payload, and the header includes source and destination node addresses and a packet sequence number.

Packetization and depacketization are performed only in a leaf node in an application layer.

Figure 5:
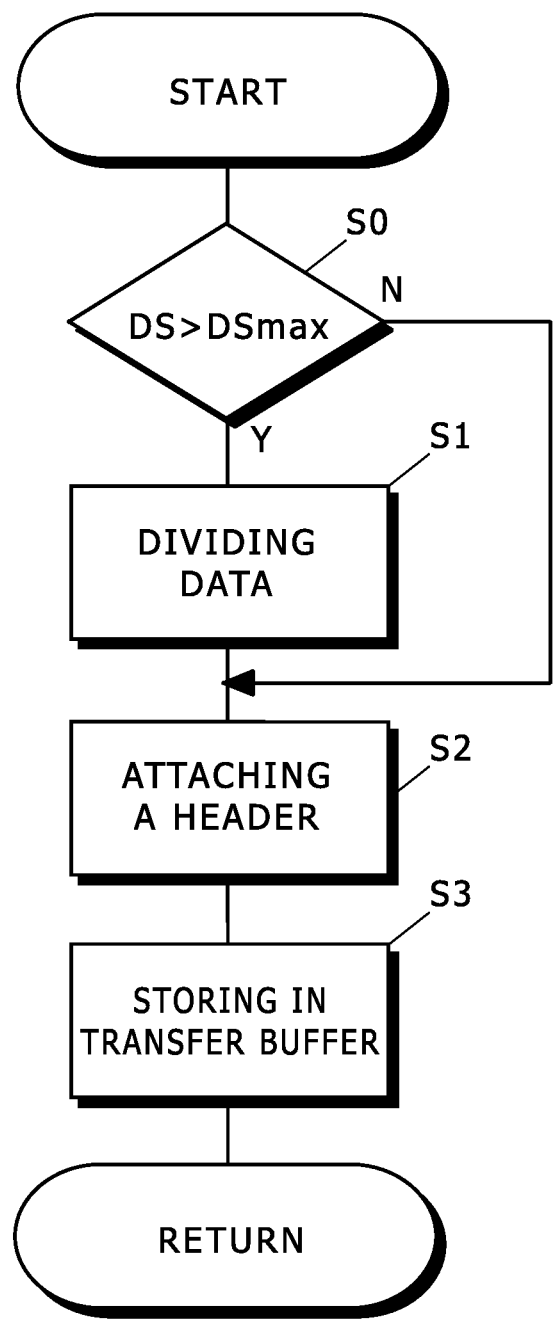
FIG. 5 shows a schematic flowchart which indicates a packetizing process of data.

FIG. 5 shows a schematic flowchart which indicates a packetizing process of data.

(Step S0) DS is defined as DS=(data size of data to be transferred)+(data size of the header), and if DS>DSmax then the process proceeds to Step S1, and otherwise the process proceeds to Step S2.

(Step S1) Data is divided into plural pieces so as to satisfy that DS is equal to or less than DSmax for each piece of the divided data.

(Step S2) Either the data or each piece of the divided data is packetized by attaching the header as shown in FIG. 4.

(Step S3) These packets are stored in a transfer buffer.

Figure 6:
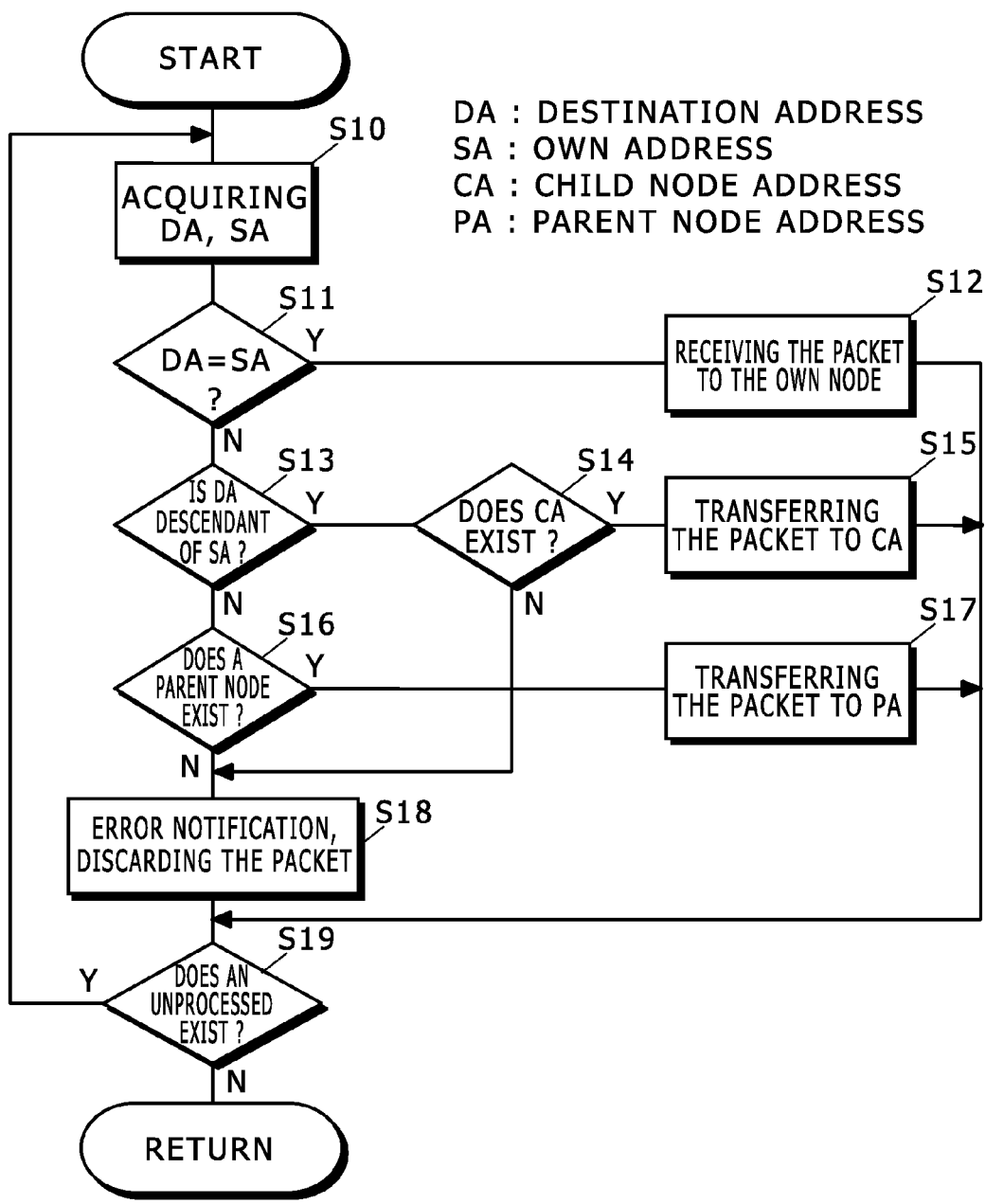
FIG. 6 shows a schematic flowchart which indicates a routing process for any one of nodes other than leaf nodes to transfer a packet in its transfer buffer to a next node.

FIG. 6 shows a schematic flowchart which indicates a routing process in any node to transfer a packet in its transfer buffer to a next node. Each node (object) in FIG. 3 is equipped with a program of this process.

Each node includes a transfer queue, and this process is started in response to an event that occurs when the transfer queue is changed from an empty status to a status that an element has been added.

A process of Steps S10 to S18 is performed every time when a top element is picked up from this reception queue.

(Step S10) The destination address DA in a packet header and the own node address SA are acquired.

(Step S11) If the destination address DA is equal to the own node address SA (i=i2, j=j2), then the process proceeds to Step S12; and otherwise the process proceeds to Step S13.

(Step S12) This packet is stored in a reception buffer for packets of which the destination is the own node, and the process proceeds to Step S19.

(Step S13) It is identified on the basis of a value of the destination address DA whether the destination address DA is a descendant node address (i=0 and 0<i2 or i=i2, j=0, and 0<j2) of the own node address SA. If it is identified that the destination address DA is a descendant node address, then the process proceeds to Step S14; and otherwise the process proceeds to Step S16.

(Step S14) If an address CA (CA=[i2, 0] or CA=[i2, j2]) of a child node which includes a descendant node in Step S13 of the own node is found as a child node address in the routing table of the own node, then the process proceeds to Step S15; and otherwise the process proceeds to Step S18.

(Step S15) The packet is transferred to the child node address CA found in Step S14, and the process proceeds to Step S19.

(Step S16) If the own node has its parent node, that is, the own node address SA does not indicate the root node, then the process proceeds to Step S17; and otherwise the process proceeds to Step S18.

(Step S17) The packet is transferred to the parent node address PA (PA=[i, 0] if i is not zero and j is not zero, PA=[0, 0] if i is not zero and j=0), and the process proceeds to Step S19.

(Step S18) An exception error is informed to an OS, and this packet is discarded. If this error can not be handled in the application side, the application stops, and if this error is ignored then the process returns to Step S10.

(Step S19) If a top element is found in the transfer queue, then the process returns to Step S10; and otherwise the process shown in FIG. 6 is terminated.

In Step S15 or Step S17, a communication interface type is selected with referring the routing table, and the destination address is converted in accordance with it. Therefore, if the middleware layer performs this process, the application layer may only use the address [i, j].

FIG. 7A and FIG. 7B show diagrams which indicate respective routing tables of a node N10 and a node N00 shown in FIG. 3. In the tables, NULL means that a value is not set. Further, a child node interface (I/F) type and a parent node interface type indicate respective interface types from the own node to a child node and from the own node to a parent node; and the value 0 indicates packet transfer within a same memory space (move a packet or its reference), the value 1 indicates packet transfer between processor cores within a same processor using MCAPI, and the value 2 indicates packet transfer between different processors using PCIe. For plural child nodes, child node interface types of the plural child nodes are described so as to separate them with a delimiter symbol "/". Interface properties of a child node and a parent node are property values required by the aforementioned communication types; and if this value is NULL, a packet is transferred using a default communication type. Further, if the value of the parent node interface type or the child node interface type is NULL, the parent node or the child node does not exist.

FIG. 7B shows cases that the interface properties are X1 and Y1 for the interface types of 1 and 2 respectively. X1 and Y1 are reference values that refer to respective data blocks (structures) in which properties are described.

For example, a program causes a processor to interactively generate settings, and the routing table is generated by converting the settings to an XML file.

In Embodiment 1, the whole multi processing system forms a tree of communication object nodes, nodes other than leaf nodes in the application layer are arranged in the middleware layer, and a packet is transmitted through one or more nodes in the tree; and therefore, in sorts of the multi processing system, it is possible to perform inter user node communication with relatively simple configuration and regardless of its hardware configuration such as a communication type and a communication path.

Embodiment 2

Figure 8:
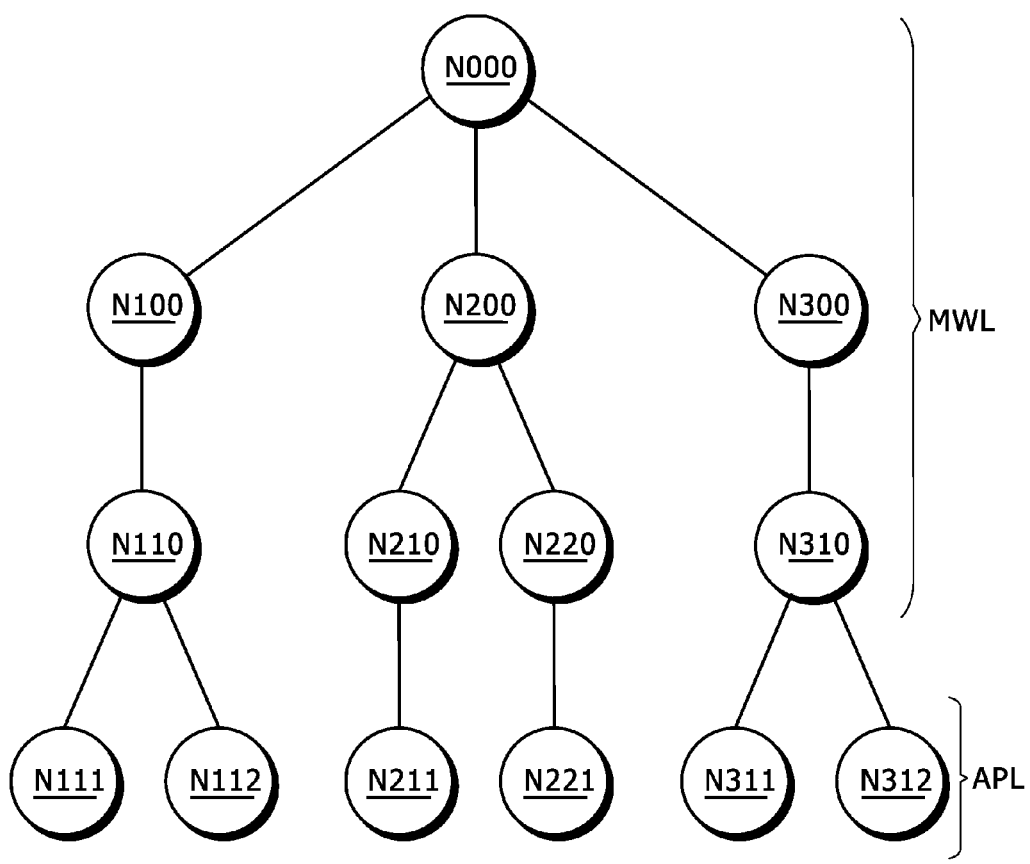
FIG. 8 shows a tree diagram of communication object nodes in Embodiment 2 of the present disclosure.

FIG. 8 shows a tree diagram of communication object nodes in Embodiment 2 of the present disclosure.

In this tree, an interface node is inserted between nodes in depths of 2 and 3 shown in FIG. 3 in order to simplify communication procedures between leaf nodes in one or two application layers. In general, when n is defined as a depth of the node tree, the number of digits (the number of numbers separated with "," between brackets) in an address of a node is n, n=3 in this case. An address of a node Nijk is described as [i, j, k] as well as in Embodiment 1.

The only difference between the nodes N000, N100, N200 in depths of 0 and 1, and N300 and the nodes N00, N10, N20, and N30 in FIG. 3 is addresses.

In general, routing at an own node Nijk is performed for a packet to the destination node Ni2j2k2 according to the following rule.

(1a) if i=i2, j=j2, and k=k2, then the own node receives the packet identified as data of which the destination is the own node.

(2a) If the own node is the root node (i=0, j=0, k=0), and a child node address CA=[i2, 0, 0] is found in the routing table, then the own node transfers the packet to this child node. If the own node is a node in a depth of 1 (i is not zero, j=0, k=0) and a child node address CA=[i2, j2, 0] is found in the routing table, then the own node transfers the packet to this child node. If the own node is a node in a depth of 2 (i is not zero, j is not zero, k=0) and a child node address CA=[i2, j2, k2] is found in the routing table, then the own node transfers the packet to this child node.

(3a) In the other cases, if the own node has a parent node, that is, the own node is not the root node, then the own node transfers the packet to the parent node address PA, that is, PA=[i, j, 0] if the own node is a leaf node (i is not zero, j is not zero, k is not zero), PA=[i, 0, 0] if the own node is a node in a depth of 2 (i is not zero, j is not zero, k=0), or PA=[0, 0, 0] if the own node is a node in a depth of 1 (i is not zero, j=0, k=0).

Since the routing process shown in FIG. 6 is easily understand on the basis of the aforementioned rule of (1a) to (1c), here it is not explained.

Packetization and depacketization are performed by the aforementioned interface nodes. These interface nodes also performs the routing process shown in FIG. 6.

Other respects are the same as Embodiment 1.

Embodiment 3

Figure 9:
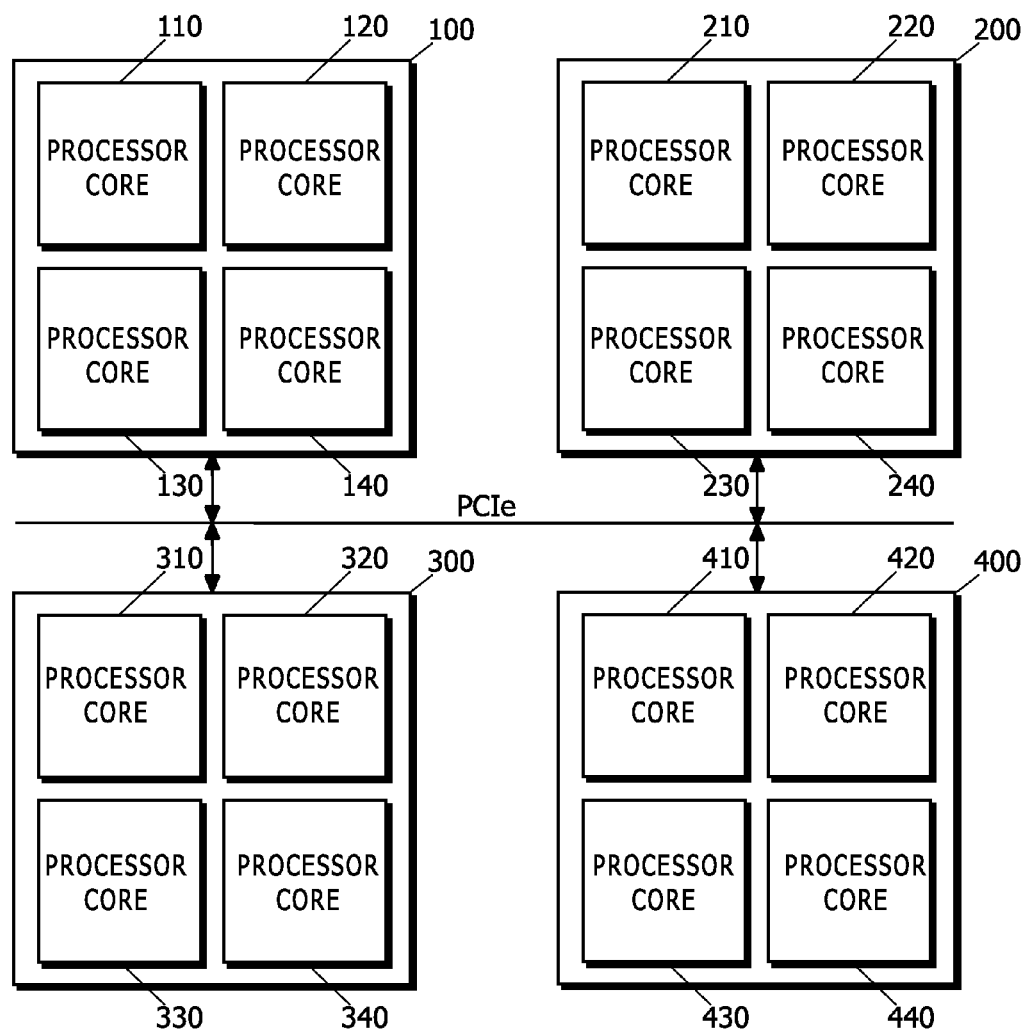
FIG. 9 shows a schematic configuration diagram which indicates a multi processing system according to Embodiment 3 of the present disclosure.

FIG. 9 shows a schematic configuration diagram which indicates a multi processing system according to Embodiment 3 of the present disclosure.

This system includes four multi core processors 100, 200, 300, and 400. The multi core processor 100 includes processor cores 110, 120, 130, and 140, and connects them with an internal bus; the multi core processor 200 includes processor cores 210, 220, 230, and 240, and connects them with an internal bus; the multi core processor 300 includes processor cores 310, 320, 330, and 340, and connects them with an internal bus; and the multi core processor 400 includes processor cores 410, 420, 430, and 440, and connects them with an internal bus. The multi core processors 100, 200, 300, and 400 are connected to each other with PCIe.

As well as mentioned, communication is performed with MCAPI between processor cores in each one of the processors, and with PCIe between the processors.

Figure 10:
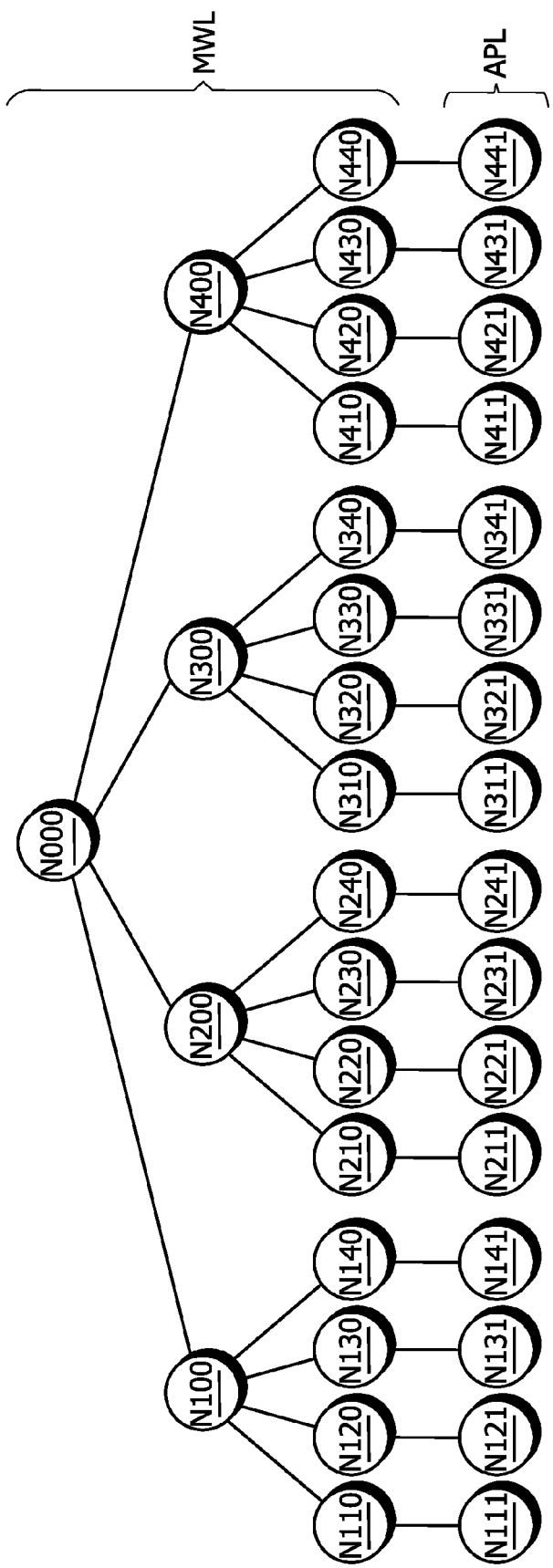
FIG. 10 shows a tree diagram of communication object nodes corresponding to FIG. 9.

FIG. 10 shows a tree diagram of communication object nodes corresponding to FIG. 9.

An address of a node Nijk is described as [i, j, k]. Among all nodes Nijk, a node with the same i, j, and k as those of an element in FIG. 9 is a node corresponding to the element. Further, a node with the same i, j, and k as suffixes of a processor core in FIG. 9, e.g. the node N110 corresponding to the processor core 110 is a communication object in a middleware layer arranged in a memory space connected to a processor core ijk, as well as in Embodiment 1.

In this tree, nodes in a depth of 1 are arranged as virtual nodes corresponding to the processors, and these nodes are root nodes of sub trees in the respective processors. The nodes in a depth of 1 reduce the number of edges connected to the root node N000, avoid packet congestion at the root node N000, and perform routing in parallel using the respective processors. Thus, the nodes in a depth of 1 are interface nodes for these purposes.

Each one of the virtual nodes is a communication object in a middleware layer arranged in a memory space in which any one of its child nodes is arranged. For example, the nodes N000 and N100 are communication objects in a middleware layer arranged in a memory space in which the node N110 is arranged.

Nodes in a depth of 3 are user nodes as well as in FIG. 3.

Other respects are the same as Embodiment 1.

In AMP, various types of configurations are applied to multi processing systems to gain cost performance and to reduce electric power consumption, and the configurations are changed when the systems are improved. In such cases, as mentioned in Embodiments 1 to 3, the inter object communication mechanism in the multi processing system of the present disclosure performs communication between user nodes regardless of hardware configuration and a type of OS in a common manner regardless of a system configuration.

Embodiment 4

Figure 11:
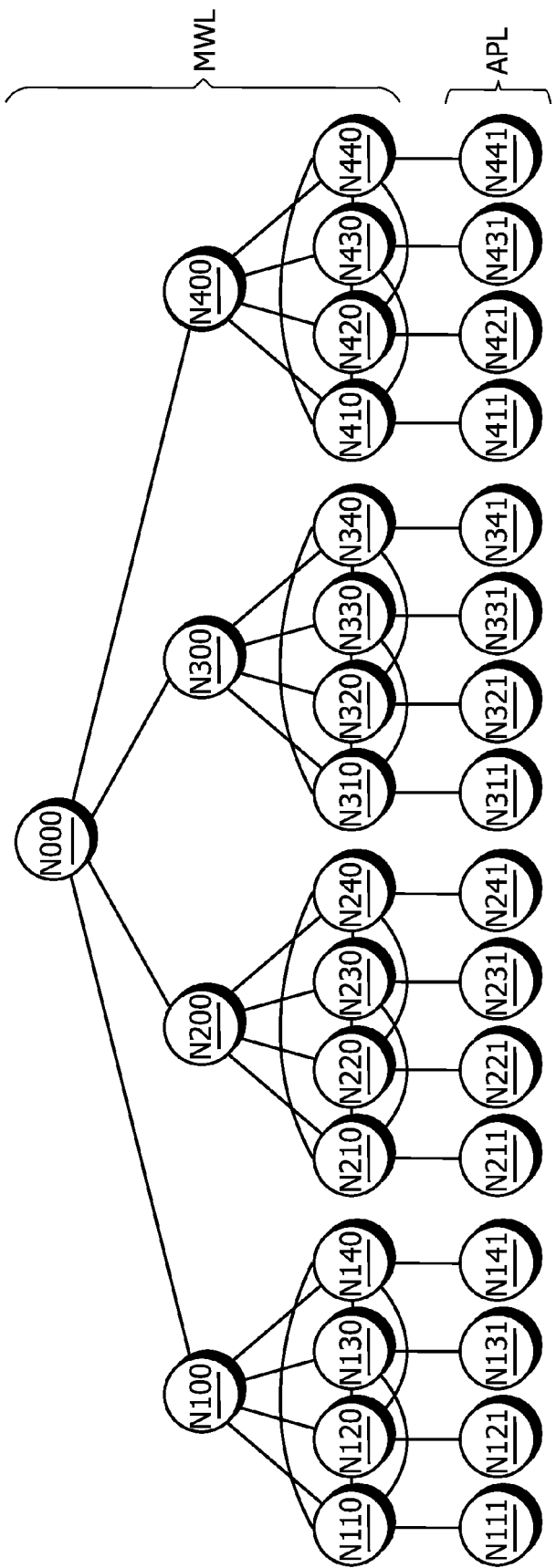
FIG. 11 shows a tree diagram of communication object nodes in Embodiment 4 of the present disclosure.

FIG. 11 shows a communication object node tree in Embodiment 4 of the present disclosure.

The hardware configuration of this embodiment is the same as that in Embodiment 9. The difference from the tree shown in FIG. 10 is that in this tree, nodes in a depth of 2 corresponding to two processor cores in one of the processors are connected with an edge and capable of direct communication with each other.

FIG. 12 shows a schematic flowchart which indicates a routing process in any node to transfer a packet in its transfer buffer to a next node. Each node in FIG. 11 is independently equipped with a program of this process.

Each node includes a transfer queue, and this process is started in response to an event that occurs when the transfer queue is changed from an empty status to a status that an element has been added.

A process of Steps S10 to S18 is performed every time when a top element is taken out from this reception queue.

The difference from the process shown in FIG. 6 is that in the process shown in FIG. 12, Step S20 is inserted between Step S11 and Step S13 for packet transfer between brother nodes, and Step S21 and Step S22 related to this are also added. In the following part, the difference is explained.

If in Step S11 the destination address DA is not equal to the own node address SA, then the process proceeds to Step S20.

(Step S20) If it is identified on the basis of a value of the destination address DA that the destination address DA is a node address of a descendant node of a brother node corresponding to the own node address SA (that an ancestor node of the destination node is a brother node of the own node) then the process proceeds to Step S21; and otherwise the process proceeds to Step S13. Specifically, identification whether the destination address DA is a node address of a descendant node of a brother node corresponding to the own node address SA is performed as follows.

When the own node is a node in a depth of 1 (i is not zero, j=0, k=0), if the brother node address BA=[i2, 0, 0] is found in the routing table, then the packet is transferred to this brother node. When the own node is a node in a depth of 2 (i is not zero, j is not zero, k=0), if the brother node address BA=[i2, j2, 0] is found in the routing table, then the packet is transferred to this brother node.

(Step S21) If the brother node address BA is found in the routing table of the own node, then the process proceeds to Step S22; and otherwise the process proceeds to Step S13.

(Step S22) The transfer type is determined referring to the routing table of the own node, the destination address is converted to an address of the transfer type, and the packet is transferred to the brother node address BA; and subsequently the process proceeds to Step S19.

FIGS. 13A to 13C indicate respective routing tables of the node N110, the node N100, and the root node N000 shown in FIG. 11. The structure of these tables is obtained by adding a node address of a brother node connected to a node, and an interface type and an interface property used for communication with the brother node to the routing table shown in FIG. 7.

Embodiment 5

In Embodiment 5, in the tree shown in FIG. 10, plural virtual nodes are arranged in respective memory spaces in which plural child nodes of the virtual nodes are arranged, and therefore, it is possible to climb the tree from any node to the root node within one of the memory spaces. Specifically, virtual nodes N000 are arranged in respective memory spaces connected to respective processor cores, virtual nodes in a depth of 1 are arranged in respective memory spaces in which child nodes of the virtual nodes are arranged so that these nodes exist in one memory space when climbing the tree from any node to the root node (i.e. the transfer buffer is also located in this memory space).

Since the virtual nodes have a same address but use different transfer types corresponding to positions of the virtual nodes, each one of the virtual nodes includes an individual routing table.

In a downward direction from the root nodes, a packet is transferred to a child node (a virtual node) that is arranged in a memory space in which the destination node is arranged among the plural child nodes that have a same address (i.e. the routing table is set so as to do so). After this, within this memory space, a packet is transferred downward through one or more nodes to the destination node.

Therefore, a ratio of a packet transfer process within one memory space increases, and consequently packet transfer is performed faster.

In the aforementioned Embodiment 5, without connecting processor cores as brother nodes in one processor as shown in FIG. 11, a packet can be transfer using a simpler common configuration as well as the manner shown in FIG. 11.

It should be noted that a configuration of this embodiment can be also applied to Embodiments 1, 2, and 4.

Embodiment 6

Packet transfer within a memory space can be performed by (a) storing a packet in a shared memory, and (b) moving a reference to the packet from a transfer queue of a node to a reception queue of a next node without actually moving the packet itself.

Figure 14:
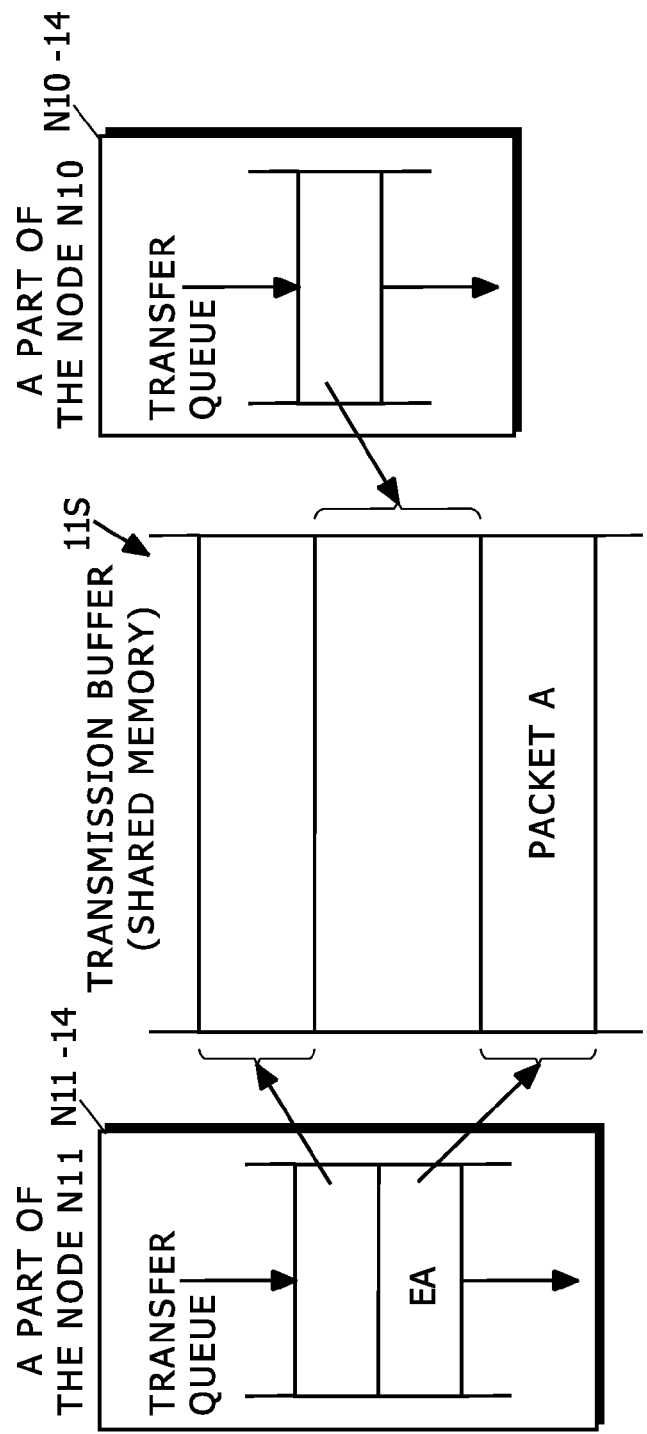
FIG. 14 shows a schematic explanation diagram of a transfer packet storage unit.

For example, as shown in FIG. 14, a transmission buffer 11S for an application 11 is allocated in this shared memory. Further, a transfer queue is established for each node in the same memory space; for example, a transfer queue N11-14 shown in FIG. 14 is established for the node N11 shown in FIG. 3, and a transfer queue N10-14 shown in FIG. 14 is established for the node N10 shown in FIG. 3.

Figure 15:
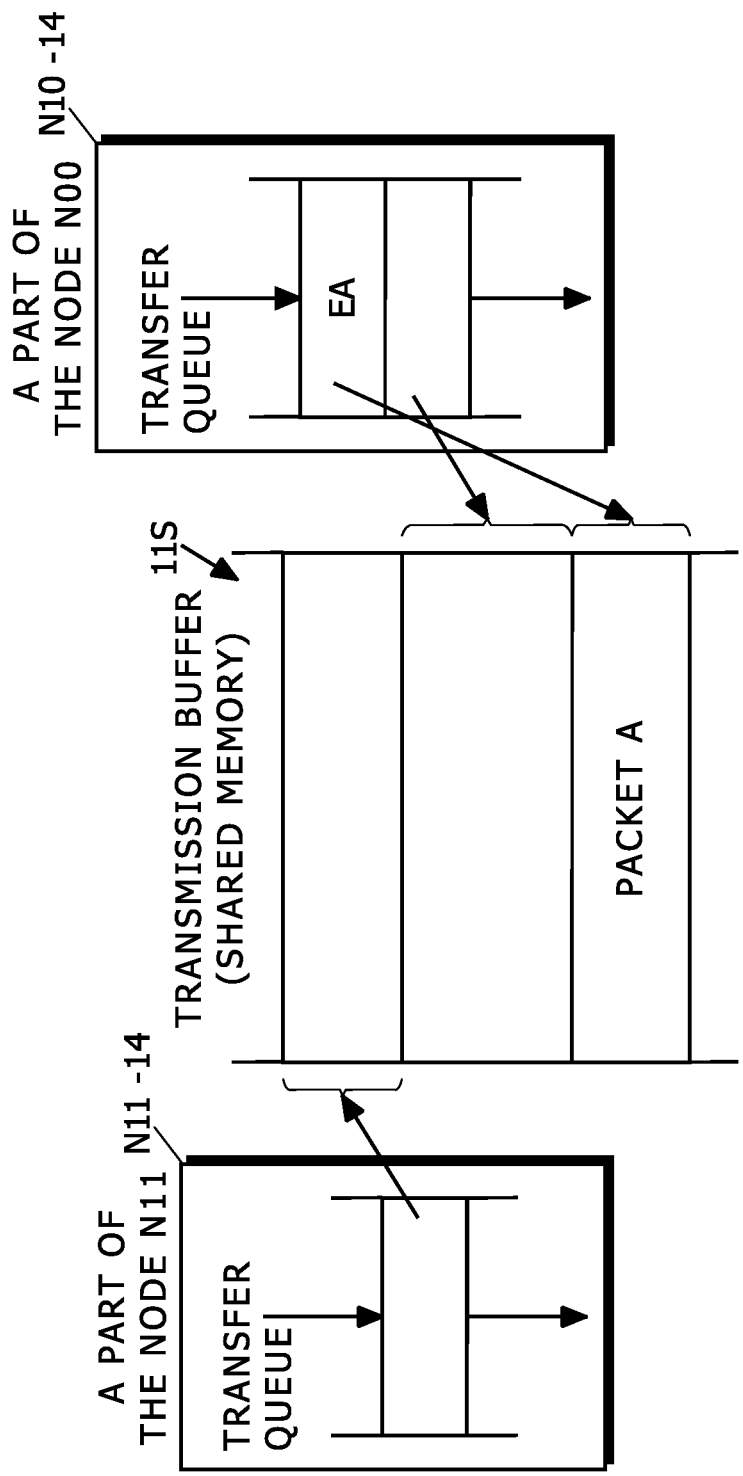
FIG. 15 shows a schematic explanation diagram of a transfer packet storage unit.

An element in each one of the queues has the top address and the number of bytes of a packet in the transmission buffer 11S as a reference. When a top element EA in the transfer queue N11-14 is picked up and a packet A in the transmission buffer 11S corresponding to it is transferred to the node N10, actually the packet itself is not transferred and this element EA is added at (moved to) the end of the transfer queue N10-14 as shown in FIG. 15 in Step S17 of FIG. 6. Consequently, the packet is logically transferred from the node N11 to the node N10.

Figure 16:
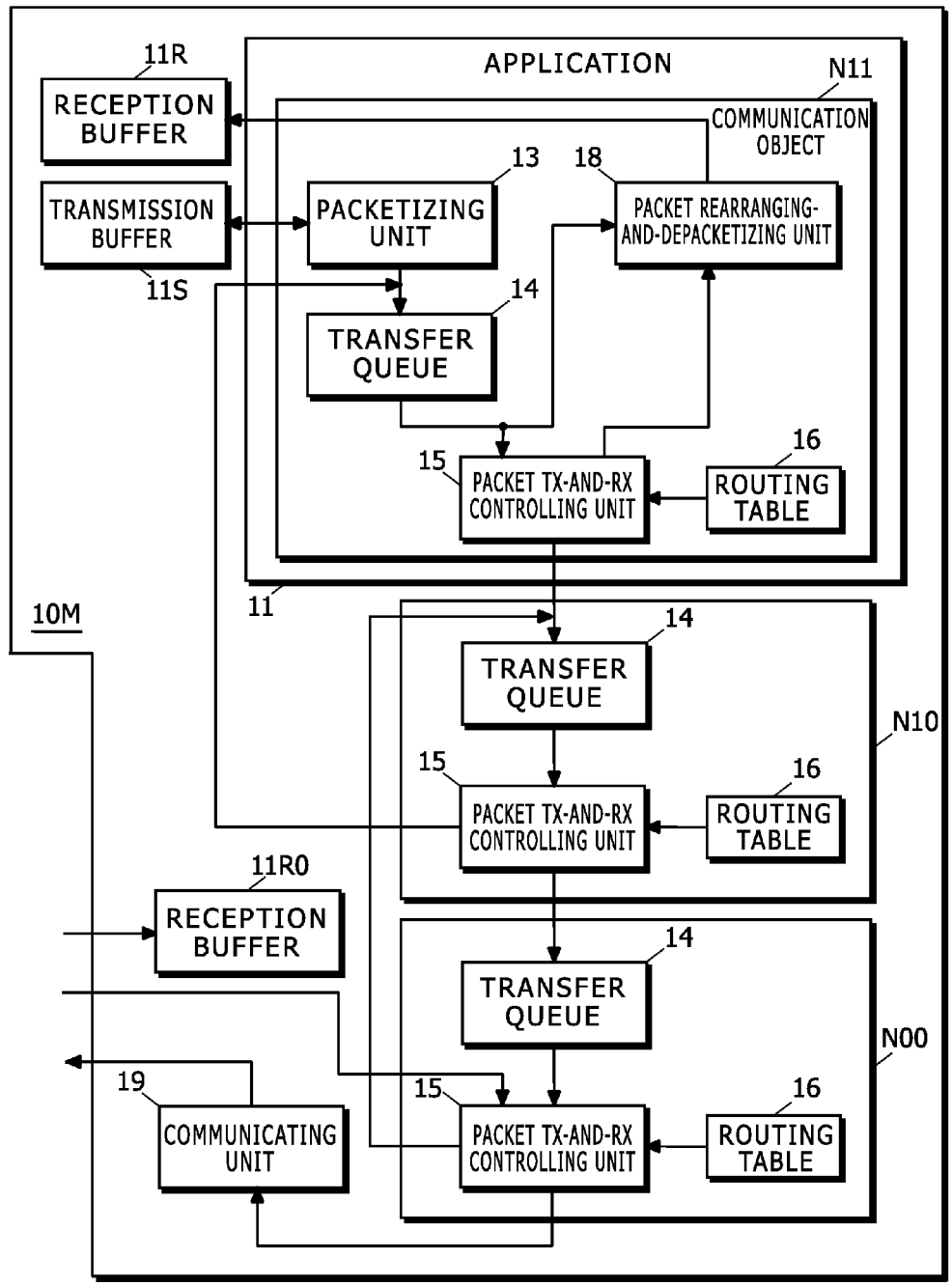
FIG. 16 shows a functional block diagram of packet transmission and reception of the nodes N10 and N00 arranged in a same memory space.

FIG. 16 shows a functional block diagram of packet transmission and reception of the nodes N11, N10 and N00 arranged in a same memory space 10M. The memory space 10M is connected to the processor core 10 shown in FIG. 1. In FIG. 16, corresponding elements in nodes are denoted with the same symbol and hereinafter an element pq in a node Nij is denoted as Nij-pq.

The node N11 is an object in an application 11, and its packetizing unit 13 packetizes data stored in the transmission buffer 11S according to the flowchart shown in FIG. 5, and adds a reference EA to the packet to the end of the transfer queue N11-14 as mentioned.

When the transfer queue N11-14 is changed from an empty status to a status that one element has been added, in response to this event a packet transmission-and-reception controlling unit N11-15 starts the process shown in FIG. 6. In aforementioned Step S17, the packet transmission-and-reception controlling unit N11-15 picks up a top element in the transfer queue N11-14, and adds it to the end of the transfer queue N10-14. Similarly, when the transfer queue N10-14 is changed from an empty status to a status that one element has been added, in response to this event a packet transmission-and-reception controlling unit N10-15 starts the process shown in FIG. 6, picks up a top element in the transfer queue N10-14, and adds it to the end of the transfer queue N00-14 in aforementioned Step S17.

When the transfer queue N00-14 is changed from an empty status to a status that one element has been added, in response to this event a packet transmission-and-reception controlling unit N00-15 starts the process shown in FIG. 6, refers to a routing table 16, converts an address on the basis of a property value of a transfer interface type in the routing table 16 if the value of the transfer interface type is 1 or 2, and causes to transmit a packet to another processor core via a communicating unit 19 in Step S15. This communicating unit 19 includes the OS layer, the driver layer and the hardware layer shown in FIG. 2.

On the other hand, a packet from the node N20 or N30 to the node N00 in FIG. 3 is received by the OS via the driver and stored in a reception buffer 11R0, and it is informed to the packet transmission-and-reception controlling unit N00-15. In response to this the packet transmission-and-reception controlling unit N00-15 starts the process shown in FIG. 6, and adds a reference to the stored packet to the end of the transfer queue N10-14 in Step S15. Similarly, in response to the aforementioned event, the packet transmission-and-reception controlling unit N10-15 starts the process shown in FIG. 6, picks up a top element in the transfer queue N10-14, and adds it to the end of the transfer queue N11-14 in Step S15. In response to the aforementioned event, the packet transmission-and-reception controlling unit N11-15 starts the process shown in FIG. 6, picks up a top element in the transfer queue N11-14, and stores this packet in a reception buffer 11R via a packet rearranging-and-depacketizing unit 18 in Step S12 of FIG. 6. Here the packet rearranging-and-depacketizing unit 18 reads out plural received packets in the reception buffer 11R0 specified by the reference to the packet, classifies them by the source address, rearranges the packets in the order of the packet sequence number, deletes headers of the packets, links payloads of the packets, and stores a series of the data (the payloads) in the reception buffer 11R.

Other respects are the same as Embodiment 1.

Embodiment 7

A multi processing system in Embodiment 7 of the present disclosure has the same configuration as that (in FIGS. 1 to 4) in Embodiment 1, and performs a data packetizing process (in FIG. 5) as well as in Embodiment 1.

In FIG. 3, when a position of a leaf node is changed in a tree due to an improvement of software or hardware, according to it an address of it must be changed. To avoid this bother, as described under a leaf node in FIG. 3, a name corresponding to a node address is used instead of the node address.

Figure 17A:
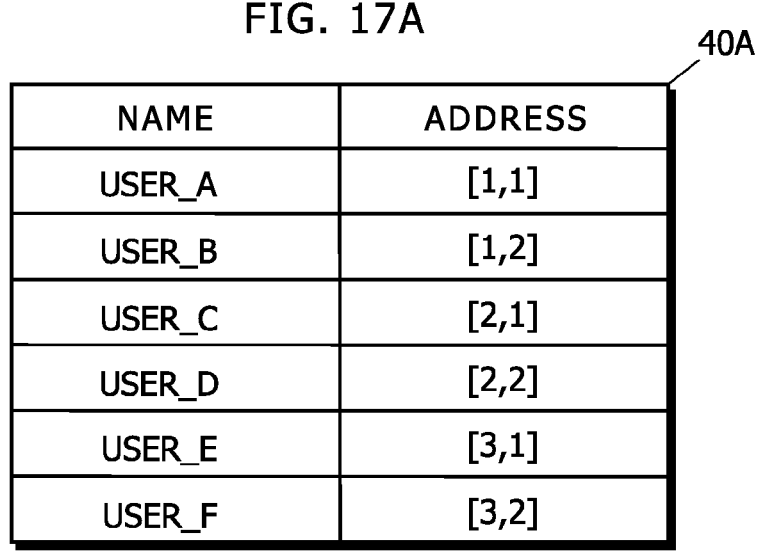
FIG. 17A shows a diagram which indicates a name resolution table of a leaf node or a root node shown in FIG. 3, and FIG. 17B to FIG. 17D show diagrams which indicate respective routing tables of the nodes N10, N20 and N30.

FIG. 17A indicates a name resolution table to convert a name of each leaf node to an address. The name resolution table is arranged in one of the following manners (A) to (C).

(A) Only each leaf node is equipped with the name resolution table 40A (at least one name resolution table is arranged in a memory space, and a leaf node refers to this).

If the source node uses a name instead of an address in a header of a packet, the name in the header is changed to an address referring to the name resolution table 40A (i.e. name resolution is performed). This method enables the packet source node to perform name resolution, but a memory usage amount in the whole system increases proportionally to the number of leaf nodes.

(B) Only a root node is equipped with the name resolution table 40A.

In this case, to perform name resolution, a packet must be transferred to the root node.

(C) Each node other than leaf nodes is equipped with a name resolution table on this node and its descendant node(s).

Figure 17B:
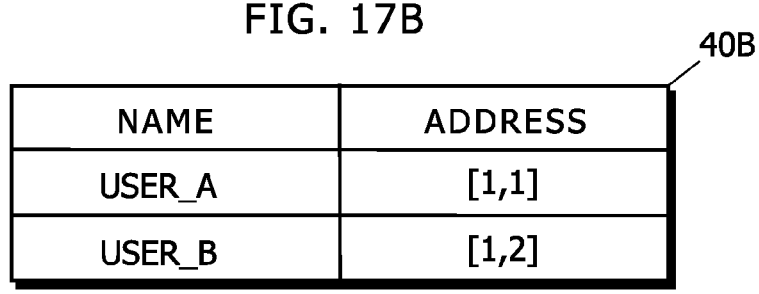
Figure 17C:
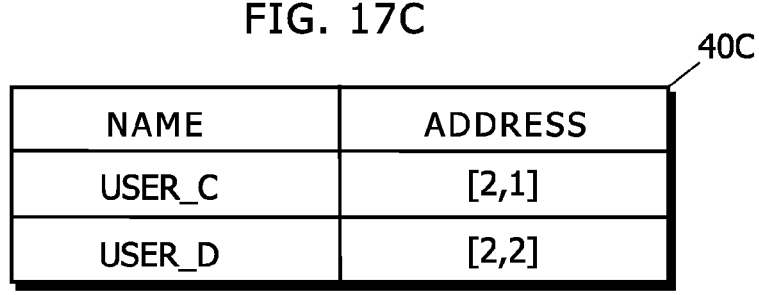
Figure 17D:
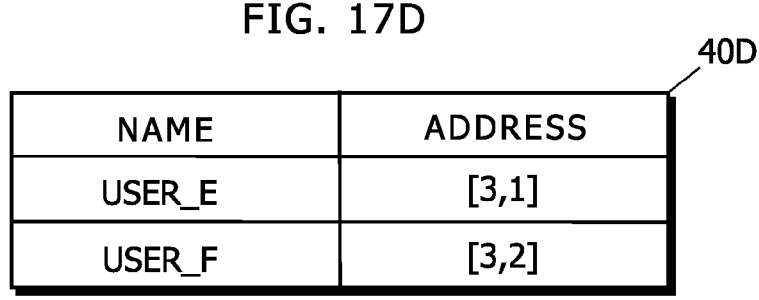

Specifically, the node N00 in FIG. 3 is equipped with the name resolution table 40A shown in FIG. 17A, and the nodes N10, N20, and N30 in a depth of 1 are equipped with the name resolution tables 40B to 40D shown in FIGS. 17B to 17D, respectively. Each node equipped with the name resolution table tries name resolution if a name in a packet has not been resolved, resolves the name if the name resolution is possible, and transfers the packet to its parent node if the name resolution is impossible.

Figure 18:
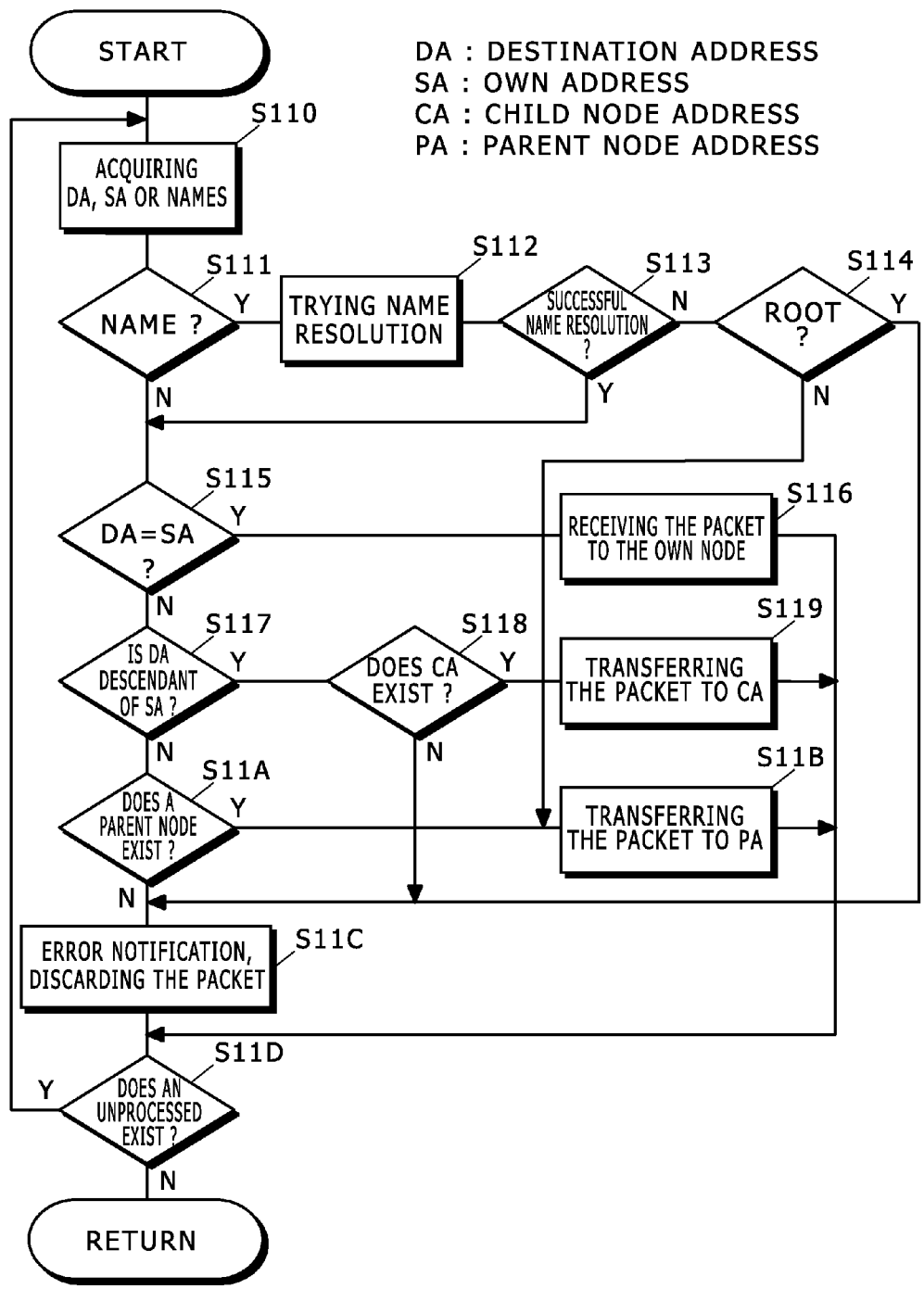
FIG. 18 shows a schematic flowchart which indicates a routing process in any one of nodes other than leaf nodes to transfer a packet in its transfer buffer to a next node.

FIG. 18 shows a schematic flowchart which indicates a routing process in any node to transfer a packet in its transfer buffer to a next node. Each node (object) in FIG. 3 is equipped with a program of this process. The name resolution table may be arranged in whichever of the aforementioned manners (A) to (C).

Each node is equipped with a transfer queue, and this process is started in response to an event that occurs when the transfer queue is changed from an empty status to a status that an element has been added.

Every time when a top element is picked up from this transfer queue, the process in and after Step S110 is performed.

(Step S110) Either a destination address DA in a packet header and an own node address SA or names of them are acquired.

(Step S111) If the both addresses are acquired, then the process proceeds to Step S115; and otherwise if at least one name is acquired, then the process proceeds to Step S112.

(Step S112) If the acquired name is found in the name resolution table of the own node, then the name is converted to an address, and the name in the header is changed to the address. If the own node is not equipped with the name resolution table, then it is regarded that the acquired name is not found in a name resolution table.

(Step S113) If the name of the destination has been resolved, then the process proceeds to Step S115; and otherwise the process proceeds to Step S114.

(Step S114) If the own node is a root node, then the process proceeds to Step S11C; and otherwise the process proceeds to Step S11B.

(Step S115) If the destination address DA is equal to the own node address SA (if i=i2 and j=j2) then, the process proceeds to Step S116; and otherwise the process proceeds to Step S117.

(Step S116) This packet is stored in a reception buffer for packets of which the destination is the own node, and the process proceeds to Step S11D.

(Step S117) It is identified on the basis of a value of the destination address DA whether the destination address DA is a descendant node address (i=0 and 0<i2 or i=i2, j=0, and 0<j2) of the own node address SA. If it is identified that the destination address DA is a descendant node address, then the process proceeds to Step S118; and otherwise the process proceeds to Step S11A.

(Step S118) If an address CA (CA=[i2, 0] or CA=[i2, j2]) of a child node which includes a descendant node in Step S117 of the own node is found as a child node address in the routing table of the own node, then the process proceeds to Step S119; and otherwise the process proceeds to Step S11C.

(Step S119) The packet is transferred to the child node address CA found in Step S118, and the process proceeds to Step S11D.

(Step S11A) If the own node has its parent node, that is, the own node address SA does not indicate the root node, then the process proceeds to Step S11B; and otherwise the process proceeds to Step S11C.

(Step S11B) The packet is transferred to the parent node address PA (PA=[i, 0] if i is not zero and j is not zero, PA=[0, 0] if i is not zero and j=0), and the process proceeds to Step S11D.

(Step S11C) An exception error is informed to an OS, and this packet is discarded. If this error can not be handled in the application side, the application stops, and if this error is ignored then the process returns to Step S110.

(Step S11D) If a top element is found in the transfer queue, then the process returns to Step S110; and otherwise the process shown in FIG. 18 is terminated.

In Step S119 or Step S11B, a communication interface type is selected with referring the routing table, and the destination address is converted in accordance with it. Therefore, if the middleware layer performs this process, the application layer may only use the address [i, j]. For example, the routing tables shown in FIG. 8A and FIG. 8B may be used here.

Figure 19:
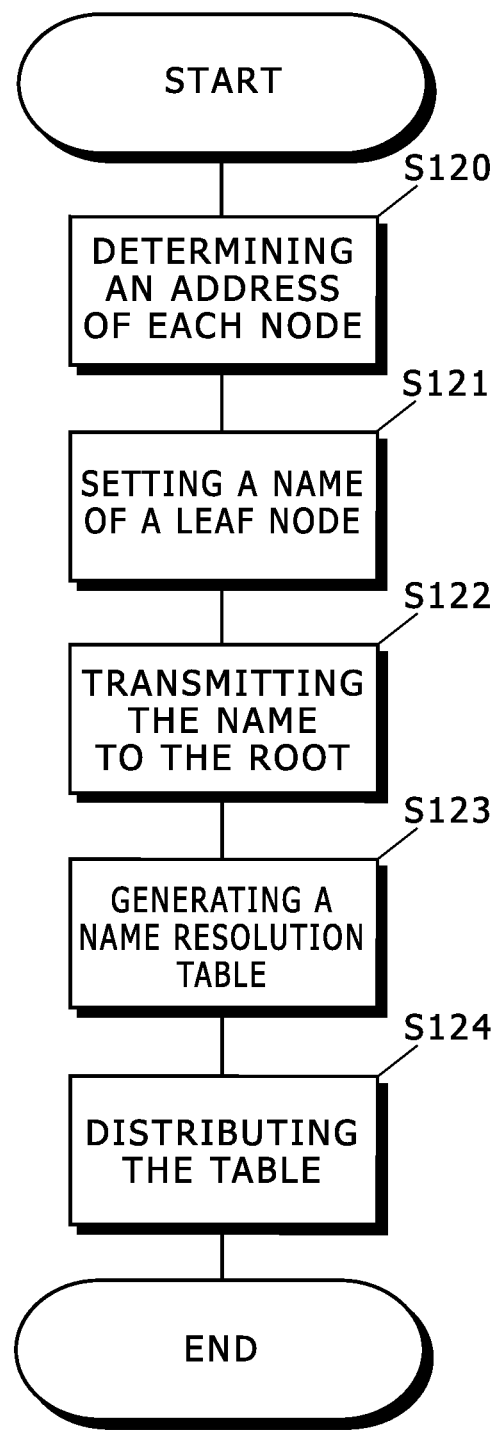
FIG. 19 shows a schematic flowchart which indicates procedures for generating a name resolution table.

FIG. 19 shows a schematic flowchart which indicates procedures for automatically generating a name resolution table and automatically distributing it to nodes other than leaf nodes. This process is performed in an initialization process of the multi processing system.

(Step S120) An address of each node is determined. For example, in FIG. 3, addresses of the node N10, N20, and N30 corresponding to respective processor cores are determined in the order of detecting the processor cores, and an address of a parent node of them, that is, a root node is set as [0, 0]. The root node is arranged in a memory space of the processor core that was found at first or in a memory space of a processor core selected by a user. Each leaf node declared in an application is set as a child node of the node N10, N20, or N30 that is arranged in a memory space that this leaf node is arranged, and an address of this leaf node is determined in the same manner shown in FIG. 3.

(Step S121) Each leaf node relates a name of the leaf node declared in an application with the address determined in Step S120.

(Step S122) Each leaf node transmits a packet that the destination address is set as the root node address [0, 0], the source address is set the own node address, and the payload includes a name of the own node.

(Step S123) The root node receives the packet transmitted in Step S122, and generates the name resolution tables 40A to 40D as shown in FIGS. 17A to 17D.

(Step S124) The root node stores the name resolution table 40A to be used for the own node, and distributes the name resolution tables 40B to 40D to the node N10, N20, and N30, respectively. The nodes N10, N20, and N30 receive and store the respective name resolution tables to be used for the respective own nodes.

In Embodiment 7, the whole multi processing system forms a tree of communication object nodes, nodes other than leaf nodes in the application layer are arranged in the middleware layer, and a packet is transmitted through one or more nodes in the tree; and therefore, in sorts of the multi processing system, it is possible to perform inter user node communication with relatively simple configuration and regardless of its hardware configuration such as a communication type and a communication path. Further, it is possible to transmit a packet between leaf nodes using a name instead of an address, and therefore, even if a position of a leaf node is changed in a tree due to an improvement of software or hardware, it is not necessary to change its address according to the position change.

Embodiment 8

A multi processing system in Embodiment 8 of the present disclosure performs the routing process of Embodiment 7 (shown in FIG. 18) under the rules (1a) to (1c) of Embodiment 2. Other components and actions of the multi processing system in Embodiment 8 of the present disclosure are the same as those in Embodiment 7.

Embodiment 9

The multi processing system in Embodiment 9 of the present disclosure has the same configuration as that in Embodiment 3, and the routing process of Embodiment 8 is applied to the multi processing system in Embodiment 9. Other components and actions of the multi processing system in Embodiment 9 of the present disclosure are the same as those in Embodiment 7.

Embodiment 10

A communication object node tree in Embodiment 10 of the present disclosure is the same as that shown in FIG. 11.

The hardware configuration of this embodiment is the same as that in Embodiment 9. The difference from the tree shown in FIG. 10 is that in this tree, nodes in a depth of 2 corresponding to two processor cores in one of the processors are connected with an edge and capable of direct communication with each other.

Figure 20:
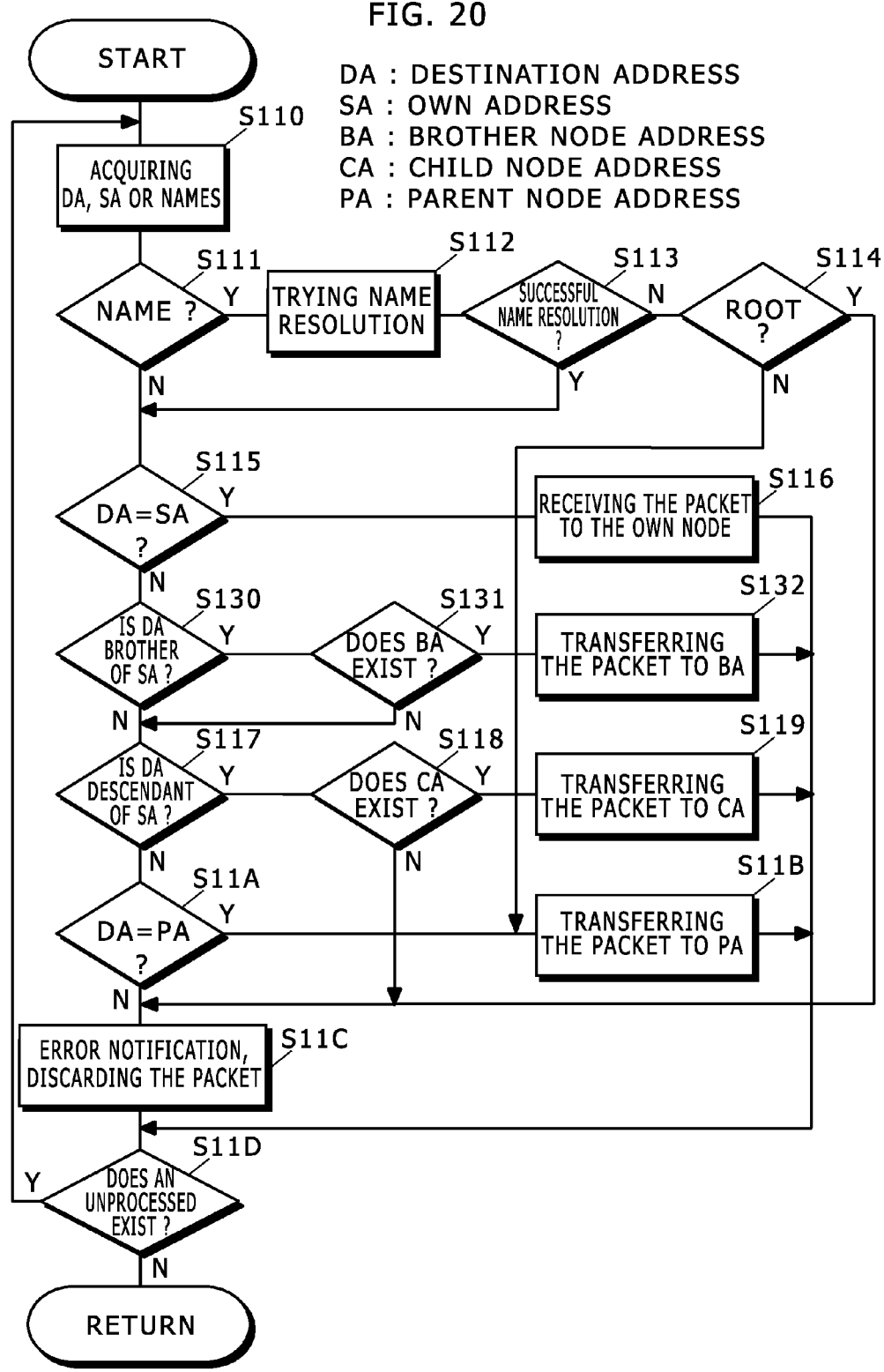
FIG. 20 shows a schematic flowchart which indicates a routing process in any one of nodes other than leaf nodes to transfer a packet in its transfer buffer to a next node.

FIG. 20 shows a schematic flowchart which indicates a routing process in any node to transfer a packet in its transfer buffer to a next node. Each node in FIG. 20 is independently equipped with a program of this process.

Each node is equipped with a transfer queue, and this process is started in response to an event that occurs when the transfer queue is changed from an empty status to a status that an element has been added.

Every time when a top element is picked up from this transfer queue, the process in and after Step S110 is performed.

The difference from the process shown in FIG. 18 is that in the process shown in FIG. 20, Step S130 is inserted between Step S115 and Step S117 for packet transfer between brother nodes, and Step S131 and Step S132 related to this are also added. In the following part, the difference is explained.

If in Step S115 the destination address DA is not equal to the own node address SA, then the process proceeds to Step S130.

(Step S130) If it is identified on the basis of a value of the destination address DA that the destination address DA is a node address of a descendant node of a brother node corresponding to the own node address SA (that an ancestor node of the destination node is a brother node of the own node) then the process proceeds to Step S131; and otherwise the process proceeds to Step S117. Specifically, identification whether the destination address DA is a node address of a descendant node of a brother node corresponding to the own node address SA is performed as follows. When the own node is a node in a depth of 1 (i is not zero, j=0, k=0), if the brother node address BA=[i2, 0, 0] is found in the routing table, then the packet is transferred to this brother node. When the own node is a node in a depth of 2 (i is not zero, j is not zero, k=0), if the brother node address BA=[i2, j2, 0] is found in the routing table, then the packet is transferred to this brother node.

(Step S131) If the brother node address BA is found in the routing table of the own node, then the process proceeds to Step S132; and otherwise the process proceeds to Step S117.

(Step S132) The transfer type is determined referring to the routing table of the own node, the destination address is converted to an address of the transfer type, and the packet is transferred to the brother node address BA; and subsequently the process proceeds to Step S11C. For example, the routing tables shown in FIGS. 13A to 13C may be used here.

Other components and actions of the multi processing system in Embodiment 10 of the present disclosure are the same as those in Embodiment 9.

Embodiment 11

In Embodiment 11, in the tree shown in FIG. 10, plural virtual nodes are arranged in respective memory spaces in which plural child nodes of the virtual nodes are arranged, and therefore, it is possible to climb the tree from any node to the root node within one of the memory spaces. Specifically, virtual nodes N000 are arranged in respective memory spaces connected to respective processor cores, virtual nodes in a depth of 1 are arranged in respective memory spaces in which child nodes of the virtual nodes are arranged so that these nodes exist in one memory space when climbing the tree from any node to the root node (i.e. the transfer buffer is also located in this memory space). Since the virtual nodes have a same address but use different transfer types corresponding to positions of the virtual nodes, each one of the virtual nodes includes an individual routing table.

In a downward direction from the root nodes, a packet is transferred to a child node (a virtual node) that is arranged in a memory space in which the destination node is arranged among the plural child nodes that have a same address.

Therefore, a ratio of a packet transfer process within one memory space increases, and consequently packet transfer is performed faster.

Other respects are the same as Embodiment 9.

In the aforementioned Embodiment 11, without connecting processor cores as brother nodes in one processor as shown in FIG. 11, a packet can be transfer using a simpler common configuration as well as the manner shown in FIG. 11.

It should be noted that a configuration of this embodiment can be also applied to Embodiments 7, 8, and 10.

Embodiment 12

Packet transfer within a memory space can be performed by (a) storing a packet in a shared memory, and (b) moving a reference to the packet from a transfer queue of a node to a reception queue of a next node without actually moving the packet itself.

For example, as shown in FIG. 14, a transmission buffer 11S for an application 11 is allocated in this shared memory. Further, a transfer queue is established for each node in the same memory space; for example, a transfer queue N11-14 shown in FIG. 14 is established for the node N11 shown in FIG. 3, and a transfer queue N10-14 shown in FIG. 14 is established for the node N10 shown in FIG. 3.

An element in each one of the queues has the top address and the number of bytes of a packet in the transmission buffer 11S as a reference. When a top element EA in the transfer queue N11-14 is picked up and a packet A in the transmission buffer 11S corresponding to it is transferred to the node N10, actually the packet itself is not transferred and this element EA is added at (moved to) the end of the transfer queue N10-14 as shown in FIG. 15 in Step S11A of FIG. 18. Consequently, the packet is logically transferred from the node N11 to the node N10.

Figure 21:
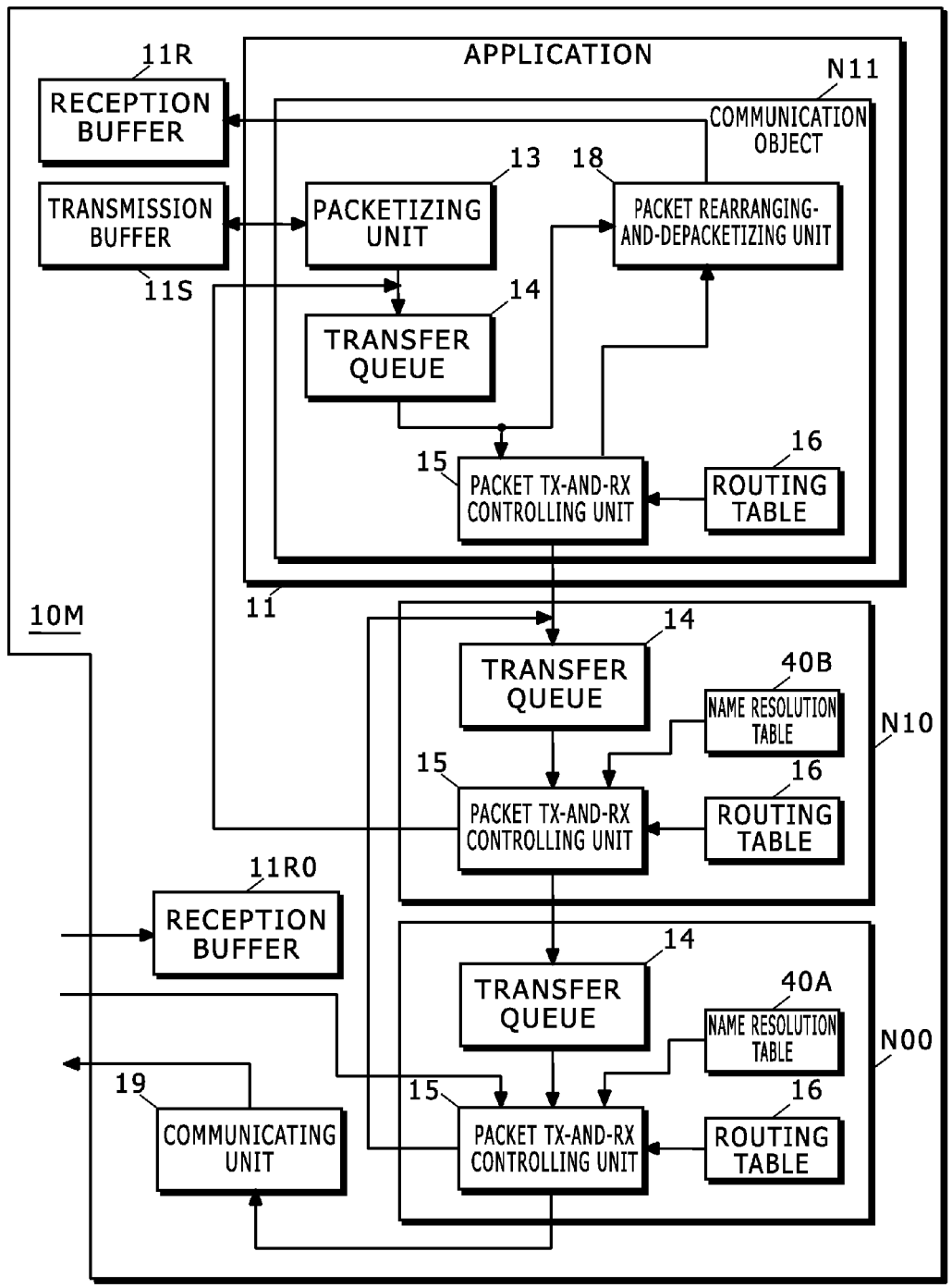
FIG. 21 shows a functional block diagram of packet transmission and reception of the nodes N10 and N00 arranged in a same memory space.

FIG. 21 shows a functional block diagram of packet transmission and reception of the nodes N11, N10 and N00 arranged in a same memory space 10M. The memory space 10M is connected to the processor core 10 shown in FIG. 1. In FIG. 21, corresponding elements in nodes are denoted with the same symbol and hereinafter an element pq in a node Nij is denoted as Nij-pq.

The node N11 is an object in an application 11, and its packetizing unit 13 packetizes data stored in the transmission buffer 11S according to the flowchart shown in FIG. 5, and adds a reference EA to the packet to the end of the transfer queue N11-14 as mentioned.

When the transfer queue N11-14 is changed from an empty status to a status that one element has been added, in response to this event a packet transmission-and-reception controlling unit N11-15 starts the process shown in FIG. 18. In aforementioned Step S11A, the packet transmission-and-reception controlling unit N11-15 picks up a top element in the transfer queue N11-14, and adds it to the end of the transfer queue N10-14. Similarly, when the transfer queue N10-14 is changed from an empty status to a status that one element has been added, in response to this event a packet transmission-and-reception controlling unit N10-15 starts the process shown in FIG. 18, picks up a top element in the transfer queue N10-14, and adds it to the end of the transfer queue N00-14 in aforementioned Step S11A.

When the transfer queue N00-14 is changed from an empty status to a status that one element has been added, in response to this event a packet transmission-and-reception controlling unit N00-15 starts the process shown in FIG. 18, refers to a routing table 16, converts an address on the basis of a property value of a transfer interface type in the routing table 16 if the value of the transfer interface type is 1 or 2, and causes to transmit a packet to another processor core via a communicating unit 19 in Step S118. This communicating unit 19 includes the OS layer, the driver layer and the hardware layer shown in FIG. 2.

On the other hand, a packet from the node N20 or N30 to the node N00 in FIG. 3 is received by the OS via the driver and stored in a reception buffer 11R0, and it is informed to the packet transmission-and-reception controlling unit N00-15. In response to this the packet transmission-and-reception controlling unit N00-15 starts the process shown in FIG. 18, and adds a reference to the stored packet to the end of the transfer queue N10-14 in Step S118. Similarly, in response to the aforementioned event, the packet transmission-and-reception controlling unit N10-15 starts the process shown in FIG. 18, picks up a top element in the transfer queue N10-14, and adds it to the end of the transfer queue N11-14 in Step S118. In response to the aforementioned event, the packet transmission-and-reception controlling unit N11-15 starts the process shown in FIG. 18, picks up a top element in the transfer queue N11-14, and stores this packet in a reception buffer 11R via a packet rearranging-and-depacketizing unit 18 in Step S115 of FIG. 18. Here the packet rearranging-and-depacketizing unit 18 reads out plural received packets in the reception buffer 11R0 specified by the reference to the packet, classifies them by the source address, rearranges the packets in the order of the packet sequence number, deletes headers of the packets, links payloads of the packets, and stores a series of the data (the payloads) in the reception buffer 11R.

Other respects are the same as Embodiment 7.

The description has been presented for purposes of illustration and description, and is not intended to be exhaustive or limited to the invention in the form disclosed.

For example, the transmission buffer 11S in FIG. 14 may be a shared memory shared by plural processor cores, and in such a case, rather than a packet itself, a reference to a packet may be transferred for communication between user nodes that run in these respective processor cores.

Further, packetization and depacketization may be performed by only nodes in middleware layers directly connected to leaf node in application layers. Therefore, it may be configured so that a source leaf node specifies a destination address and a source address, and transmits data to a node in a height of 1; and a destination leaf node receives data generated by deleting headers and linking payloads in packets. In such a case, a user node is not required to handle a packet.

Furthermore, in FIG. 6, Steps S11 and S12 may be performed by only leaf nodes and Steps S16 and S17 may not be performed by the leaf nodes. This condition can be applied to those in FIG. 12, and in addition to this, in FIG. 12, Steps S20, S21, and S22 may be performed by only nodes in a depth in which brother nodes are connected with an edge.

Furthermore, in FIG. 18, Steps S114 and S115 may be performed by only leaf nodes and Steps S119 and S11A may not be performed by the leaf nodes. This condition can be applied to those in FIG. 20, and in addition to this, in FIG. 20, Steps S130, S131, and S132 may be performed by only nodes in a depth in which brother nodes are connected with an edge.

Furthermore, in the aforementioned embodiments, MCAPI is used for communication between processor cores in a multi core processor. Alternatively, communication between processor cores in a multi core processor may be performed via an area in a cache memory that plural processor cores can access, and it may be configured so to use a communication manner selected among such plural communication manners.

Furthermore, a configuration of Embodiment 5 may be also applied to Embodiment 2, 3, or 4.

Furthermore, a configuration of Embodiment 11 may be also applied to Embodiment 8, 9, or 10.

Furthermore, the present disclosure may be applied to a symmetrical multi processing system as well as an asymmetrical multi processing system.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A multi processing system, comprising:
a processor;
packet routing units arranged in respective middleware layers in first nodes corresponding to memory spaces connected to plural processor cores and configured to perform routing of a packet among parent nodes and child nodes in a tree; the tree comprising of a root node, second nodes, said first nodes and user nodes;
wherein the user nodes are objects of respective application layers in the memory spaces;
wherein said first nodes are objects that are the parent nodes of the user nodes;
wherein the second nodes are objects that are parent nodes of said first nodes and are arranged in respective processors;
wherein the root node is an object of a parent node to the second nodes; the root node being arranged in a middleware layer in a memory space connected to the plural processor cores of one of said second nodes;
wherein nodes that include the user nodes, said first nodes, and said second nodes in the tree are assigned addresses that identify parent-child relationship of the nodes; the packet includes a source address and a destination address in a header;
each one of the packet routing units is further configured to (a1) store the packet as a packet addressed to an own node if the source address in the header is identical to an own node address, (a2) transfer the packet to a child node if the source address in the header indicates the child node, and (a3) transfer the packet to a parent node of the own node in the other cases; and
each one of the packet routing units is of an own node connected to the root nodes, and is further configured to transfer the packet to the root node in the memory space of the own node when the packet routing unit transfers the packet to the parent node from the own node; wherein plural virtual nodes are arranged in the memory spaces.

2. The multi processing system according to claim 1 wherein one of said second nodes is a root node.

3. The multi processing system according to claim 1 wherein:
each node comprises a routing table in which the own node address, addresses of all child nodes of the own node, a transmission type, and a property have been registered; the transmission type is of packet transfer to a next node that is a node in a memory space different from a memory space in which the own node is arranged, and the property is of packet transfer to the next node using the transmission type; and
each one of the packet routing units is further configured to perform routing referring the routing table of the own node.

4. The multi processing system according to claim 1 wherein each one of the packet routing units is further configured to transfer a reference to the packet to a node in the memory space of the own node instead of the packet itself when the packet routing unit transfers the packet to the node.

5. A multi processing system, comprising:
a processor;
packet routing units arranged in middleware layers in first nodes corresponding to memory spaces connected to plural processor cores and configured to perform routing of a packet among parent nodes and child nodes in a tree; the tree comprising of a second node, said first nodes and user nodes;
wherein the user nodes are objects of respective application layers in the memory spaces;
wherein said first nodes are objects that are the parent nodes of the user nodes;
wherein said second node is an object that is a parent node of said first nodes;
wherein nodes that include the user nodes, said first nodes, and said second node in the tree are assigned addresses that identify parent-child relationship of the nodes; the packet includes a source address and a destination address in a header; and
each one of the packet routing units of the user nodes in the tree comprises a name resolution table and is further configured to perform a name resolution process before a routing process, the name resolution table relates a name of the user node to and an address of the user node; and the packet routing unit is further configured to (a1) convert a name used instead of either the source address or the destination address in the header to an address corresponding to the name, and (a2) replace the name in the header to the address if the name is found in the name resolution table, and (b) inform an exception error to an operating system if the name is not found in the name resolution table, in the name resolution process; wherein plural virtual nodes are arranged in the memory spaces.

6. The multi processing system according to claim 5 wherein each one of the packet routing units of nodes in the tree is further configured to (c1) store the packet as a packet addressed to an own node if the source address in the header is identical to an own node address, (c2) transfer the packet to a child node if the source address in the header indicates the child node, and (c3) transfer the packet to a parent node of the own node in the other cases.

7. The multi processing system according to claim 6 wherein said second node is a root node.

8. The multi processing system according to claim 6 wherein:
second nodes as parent nodes of said first nodes are arranged in respective processors; the tree includes a root node that is an object of a parent node of said second nodes; and the root node is arranged in a middleware layer in a memory space of one of said second nodes.

9. The multi processing system according to claim 6 wherein:
each node in the tree comprises a routing table in which the own node address, addresses of all child nodes of the own node, a transmission type, and a property have been registered;
the transmission type is of packet transfer to a next node that is a node in a memory space different from a memory space in which the own node is arranged, and the property is of packet transfer to the next node using the transmission type; and each one of the packet routing units is further configured to perform routing referring the routing table of the own node.

10. The multi processing system according to claim 6 wherein:

root nodes in trees are arranged in respective ones of the memory spaces connected to the plural processor cores; and the packet routing unit of an own node connected to one of the root nodes is further configured to transfer the packet to the root node in the memory space of the own node when the packet routing unit transfers the packet to the parent node from the own node.

11. The multi processing system according to claim 6 wherein each one of the packet routing units is further configured to transfer a reference to the packet to a node in the memory space of the own node instead of the packet itself when the packet routing unit transfers the packet to the node.

12. A multi processing system, comprising:

a processor;

packet routing units arranged in middleware layers in first nodes corresponding to memory spaces connected to plural processor cores and configured to perform routing of a packet among parent nodes and child nodes in a tree; the tree comprising of a second node, said first nodes and user nodes;

wherein the user nodes are objects of respective application layers in the memory spaces;

wherein said first nodes are objects that are the parent nodes of the user nodes;

wherein said second node is an object that is a parent node of said first nodes;

wherein nodes that include the user nodes, said first nodes, and said second node in the tree are assigned addresses that identify parent-child relationship of the nodes; the packet includes a source address and a destination address in a header; and each one of the packet routing units of nodes other than a root node in the tree does not comprises a name resolution table and is configured to transfer the packet to the parent node of the own node if a name is used instead of either the source address or the destination address in the header; and the packet routing unit of the root node comprises a name resolution table and is further configured to perform a name resolution process before a routing process, the name resolution table relates a name of the user node to and an address of the user node, and the packet routing unit of the root node is further configured to (a1) convert a name used instead of either the source address or the destination address in the header to an address corresponding to the name, and (a2) replace the name in the header to the address if the name is found in the name resolution table, and (b) inform an exception error to an operating system if the name is not found in the name resolution table, in the name resolution process; wherein plural virtual nodes are arranged in memory spaces.

13. A multi processing system, comprising:

a processor;

packet routing units arranged in middleware layers in first nodes corresponding to memory spaces connected to plural processor cores and configured to perform routing of a packet among parent nodes and child nodes in a tree; the tree comprising of a second node, said first nodes and user nodes;

wherein the user nodes are objects of respective application layers in the memory spaces;

wherein said first nodes are objects that are the parent nodes of the user nodes;

wherein said second node is an object that is a parent node of said first nodes;

wherein nodes that include the user nodes, said first nodes, and said second node in the tree are assigned addresses that identify parent-child relationship of the nodes; the packet includes a source address and a destination address in a header; and each one of the packet routing units of the user nodes in the tree is configured to transfer the packet to a parent node of the own node if a name is used instead of either the source address or the destination address in the header; and each one of the packet routing units of nodes other than the user nodes comprises a name resolution table, and is further configured to perform a name resolution process before a routing process, the name resolution table relates a name to an address for the own node and all descendant nodes of the own node, and each one of the packet routing units of nodes other than the user nodes is further configured to (a1) convert a name used instead of either the source address or the destination address in the header to an address corresponding to the name, and (a2) replace the name in the header to the address if the name is found in the name resolution table, (b) transfer the packet to a parent node of the own node if the name is not found in the name resolution table and the own node has the parent node; and (c) inform an exception error to an operating system if the name is not found in the name resolution table and the own node does not have a parent node, in the name resolution process;

wherein plural virtual nodes are arranged in memory spaces.

14. A multi processing system, comprising:

a processor;

packet routing units arranged in middleware layers in first nodes corresponding to memory spaces connected to plural processor cores and configured to perform routing of a packet among parent nodes and child nodes in a tree; the tree comprising of second nodes, said first nodes and user nodes;

wherein the user nodes are objects of respective application layers in the memory spaces;

wherein said first nodes are objects that are the parent nodes of the user nodes;

wherein said second node is an object that is a parent node of the first nodes;

wherein nodes that include the user nodes, said first nodes, and said second node in the tree are assigned addresses that identify parent-child relationship of the nodes; the packet includes a source address and a destination address in a header; and each one of the packet routing units comprises a name resolution table and is further configured to perform a name resolution process before a routing process, the name resolution table relates a name of the user node to and an address of the user node, and each one of the packet routing units is further configured to (a1) convert a name used instead of either the source address or the destination address in the header to an address corresponding to the name, and (a2) replace the name in the header to the address if the name is found in the name resolution table, (b) transfer the packet to a parent node of the own node if the name is not found in the name resolution table and the own node has the parent node; and (c) inform an exception error to an operating system if the name is not found in the name resolution table and the own node does not have a parent node, in the name resolution process; wherein plural virtual nodes are arranged in memory spaces.

* * * * *